(12) United States Patent
Mountfort et al.

(10) Patent No.: US 10,113,312 B2
(45) Date of Patent: Oct. 30, 2018

(54) PANEL FIXING ASSEMBLY

(71) Applicant: AUTEX INDUSTRIES LIMITED, Auckland (NZ)

(72) Inventors: Jonathan Seymour Mountfort, Auckland (NZ); Luke Clifford Walker, Auckland (NZ)

(73) Assignee: AUTEX INDUSTRIES LIMITED, Auckland (NZ)

( * ) Notice: Subject to any disclaimer, the term of this patent is extended or adjusted under 35 U.S.C. 154(b) by 0 days.

(21) Appl. No.: 15/340,100

(22) Filed: Nov. 1, 2016

(65) Prior Publication Data

US 2017/0121972 A1    May 4, 2017

(30) Foreign Application Priority Data

Nov. 2, 2015 (NZ) ........................................ 713850

(51) Int. Cl.
*E04B 9/24* (2006.01)
*E04B 1/41* (2006.01)
*E04B 9/00* (2006.01)
*E04B 9/04* (2006.01)

(52) U.S. Cl.
CPC ................ *E04B 9/247* (2013.01); *E04B 1/40* (2013.01); *E04B 9/003* (2013.01); *E04B 9/0435* (2013.01)

(58) Field of Classification Search
CPC ........ E04B 1/6183; E04B 9/366; E04B 9/008; E04B 9/225; E04B 9/34; E04B 9/24
USPC ................. 52/763, 766, 774, 582.2
See application file for complete search history.

(56) References Cited

U.S. PATENT DOCUMENTS

| 2,581,816 | A | * | 1/1952 | Schlueter | .............. | E04B 1/6183 |
| | | | | | | 292/204 |
| 3,221,466 | A | | 12/1965 | Downing, Jr. et al. | | |
| 3,296,763 | A | * | 1/1967 | Curl | .......................... | E06B 1/02 |
| | | | | | | 292/241 |
| 3,798,865 | A | | 3/1974 | Curtis | | |

(Continued)

FOREIGN PATENT DOCUMENTS

| AU | 315883 | 9/2007 |
| AU | 2014203325 | 7/2014 |

(Continued)

*Primary Examiner* — Brian D Mattei
*Assistant Examiner* — Daniel J Kenny
(74) *Attorney, Agent, or Firm* — Young & Thompson

(57) ABSTRACT

A connector for connecting a panel member to an overhead support structure or cross support member includes an elongate planar body with a first planar surface and second planar surface separated by a thickness dimension, having side edges and end edges. Each end portion includes an enlarged partially rounded shape. The first end portion is a fixing portion and the second end portion is a locating portion. The fixing portion includes a fixing unit to removably affix one connector to the panel capping member, overhead support structure or cross support member. The fixing portion includes a first camming body extending outwardly, having a base portion extending from the first end portion, leading to a platform portion forming at least one recessed gap for locating the camming surfaces. The fixing portion includes a further fixing unit to affix the connector to the overhead support structure or panel capping member.

30 Claims, 15 Drawing Sheets

(56) References Cited

U.S. PATENT DOCUMENTS

| | | | | |
|---|---|---|---|---|
| 3,811,785 | A * | 5/1974 | Hagglund | F16B 7/0453 |
| | | | | 403/231 |
| 4,227,355 | A * | 10/1980 | Wendt | E04B 1/86 |
| | | | | 160/196.1 |
| 4,640,077 | A | 2/1987 | Hall | |
| 4,641,987 | A | 2/1987 | Schlegel | |
| 4,720,954 | A * | 1/1988 | Scoones | E04B 9/26 |
| | | | | 52/22 |
| 6,145,264 | A | 11/2000 | Dallaire | |
| 7,258,387 | B2 * | 8/2007 | Weldy | B60J 7/08 |
| | | | | 296/100.04 |
| D647,770 | S * | 11/2011 | Watson | D8/51 |
| 8,109,048 | B2 * | 2/2012 | West | F24J 2/5211 |
| | | | | 126/623 |
| 8,535,070 | B2 | 9/2013 | Jacobs et al. | |
| 8,562,240 | B2 * | 10/2013 | Gamain | F16B 7/0473 |
| | | | | 403/255 |
| 8,723,145 | B2 * | 5/2014 | Capasso | B82Y 20/00 |
| | | | | 250/493.1 |
| 8,733,053 | B2 | 5/2014 | Kabatsi et al. | |
| 8,782,987 | B2 | 7/2014 | Kabatsi et al. | |
| 9,003,729 | B2 * | 4/2015 | West | H01L 31/042 |
| | | | | 52/173.3 |
| 9,163,402 | B2 | 10/2015 | Kabatsi et al. | |
| 9,397,607 | B2 * | 7/2016 | Atchley | H02S 20/23 |
| 9,531,319 | B2 * | 12/2016 | Braunstein | H02S 20/23 |
| 9,673,583 | B2 * | 6/2017 | Hudson | H01R 4/64 |
| 2012/0018106 | A1 * | 1/2012 | Robledo | A47H 1/04 |
| | | | | 160/330 |
| 2018/0002926 | A1 * | 1/2018 | Bergman | E04B 9/24 |

FOREIGN PATENT DOCUMENTS

| | | |
|---|---|---|
| EP | 1905916 | 4/2008 |
| NZ | 15290 | 1/1978 |
| NZ | 21198 | 5/1987 |
| NZ | 409296 | 3/2008 |

* cited by examiner

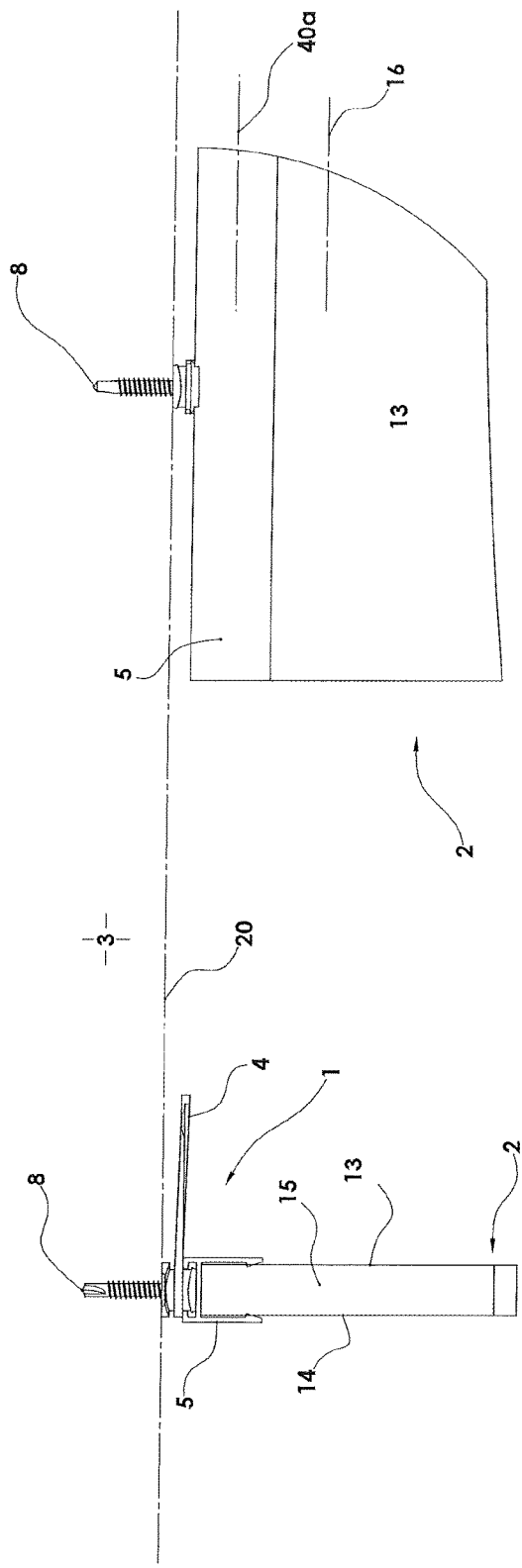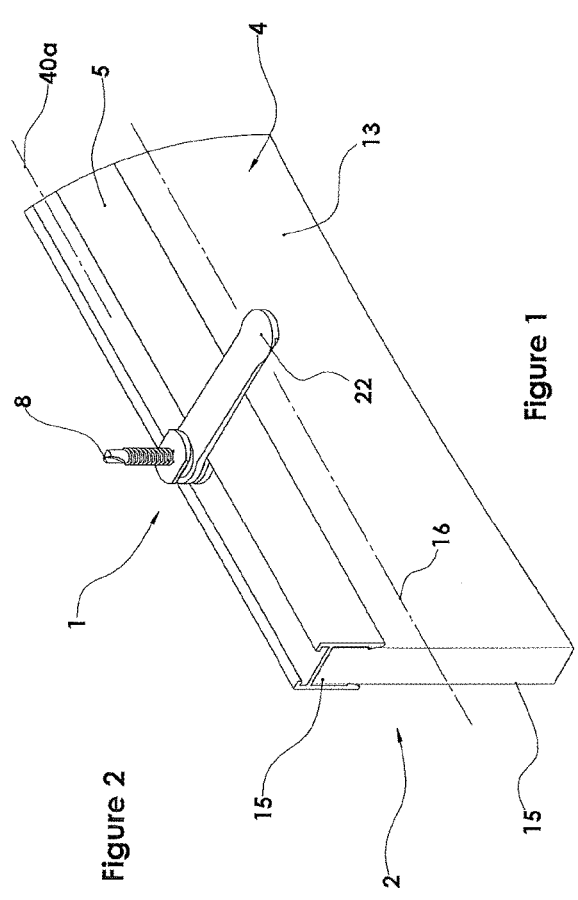

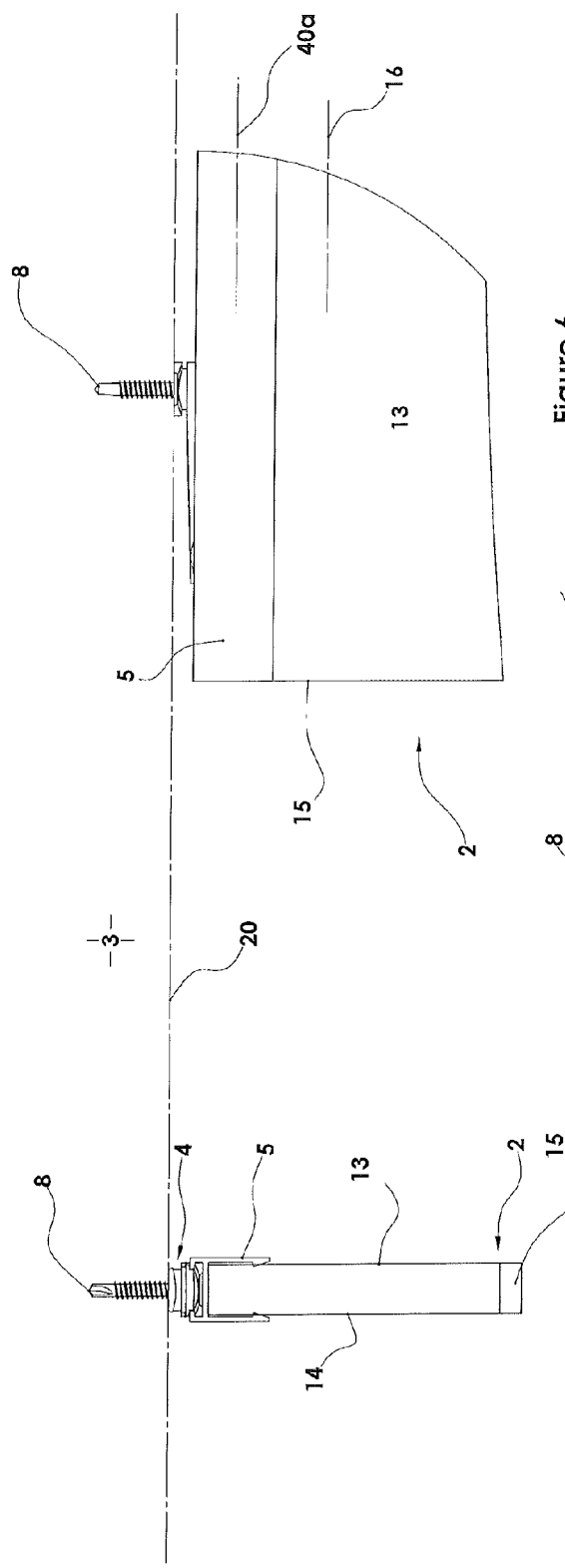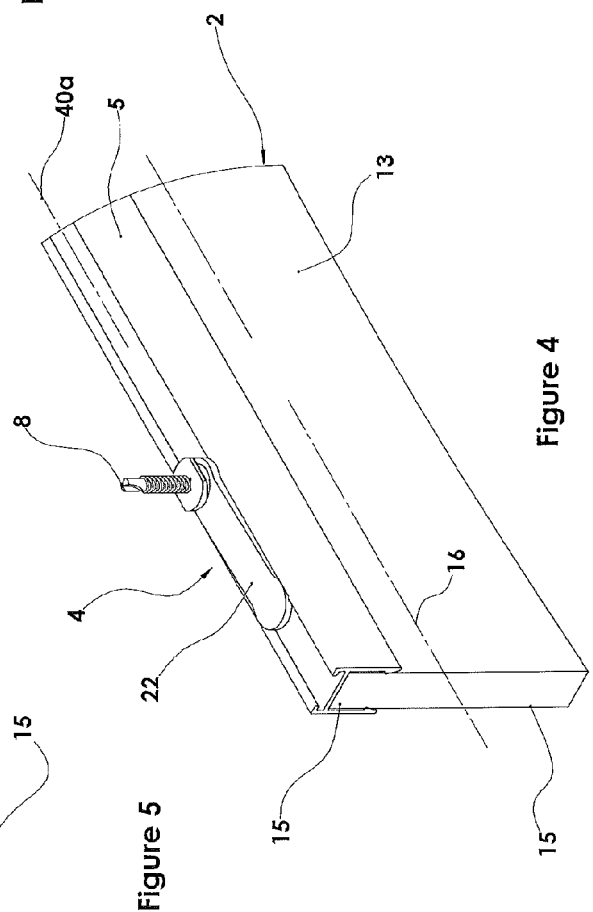

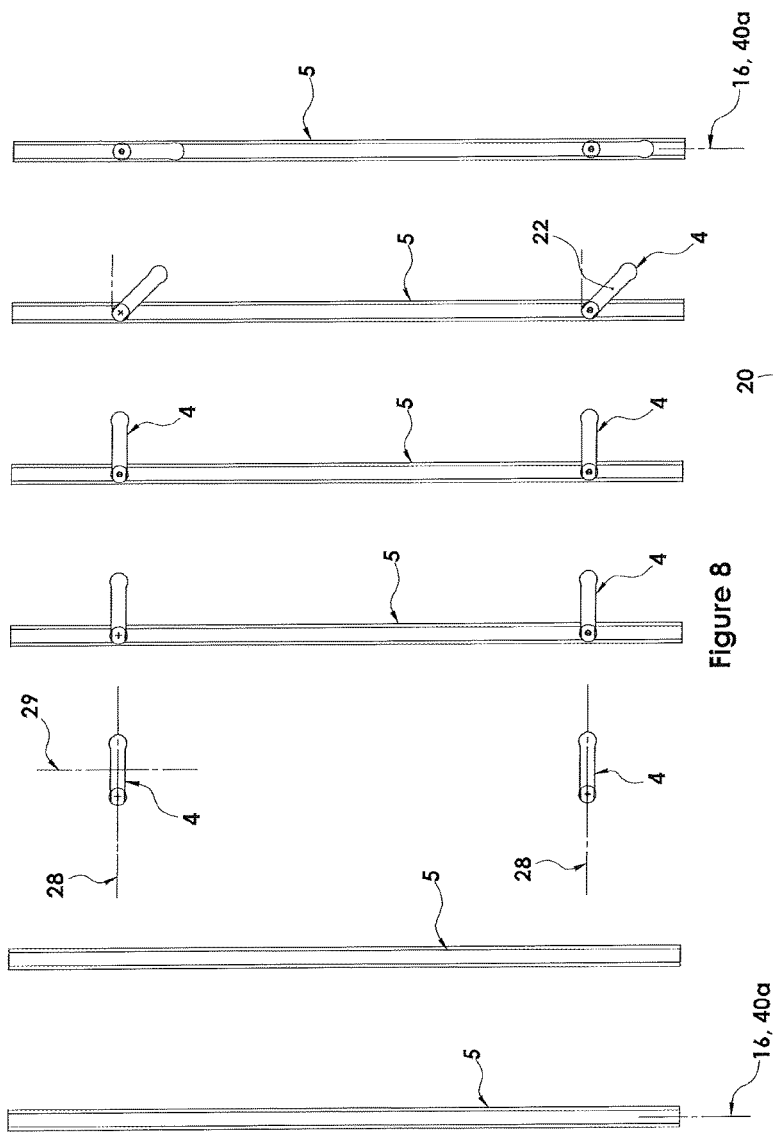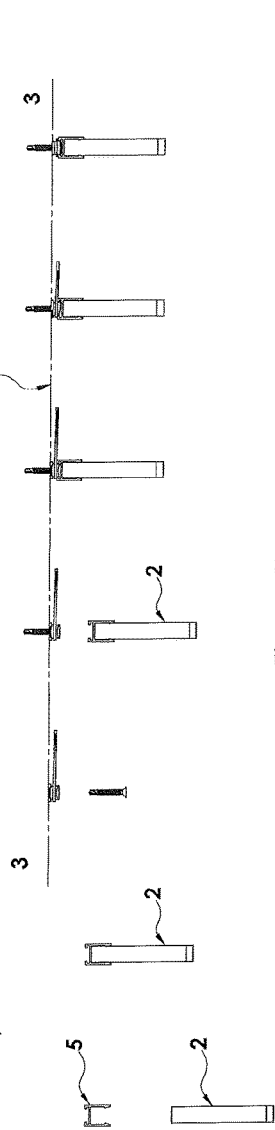
Figure 8
Figure 7

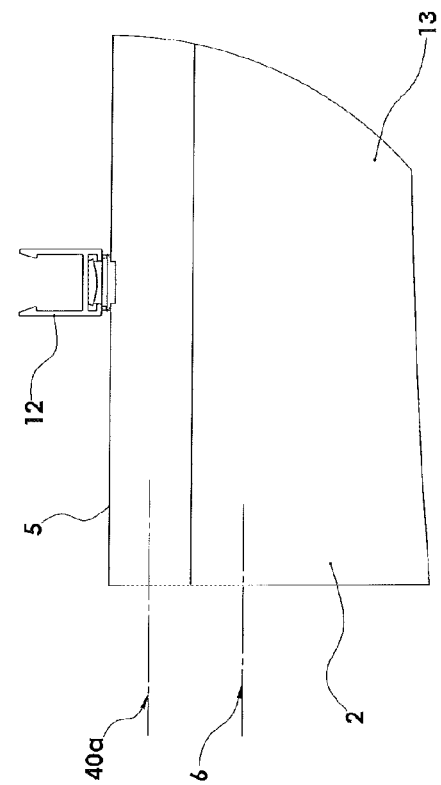
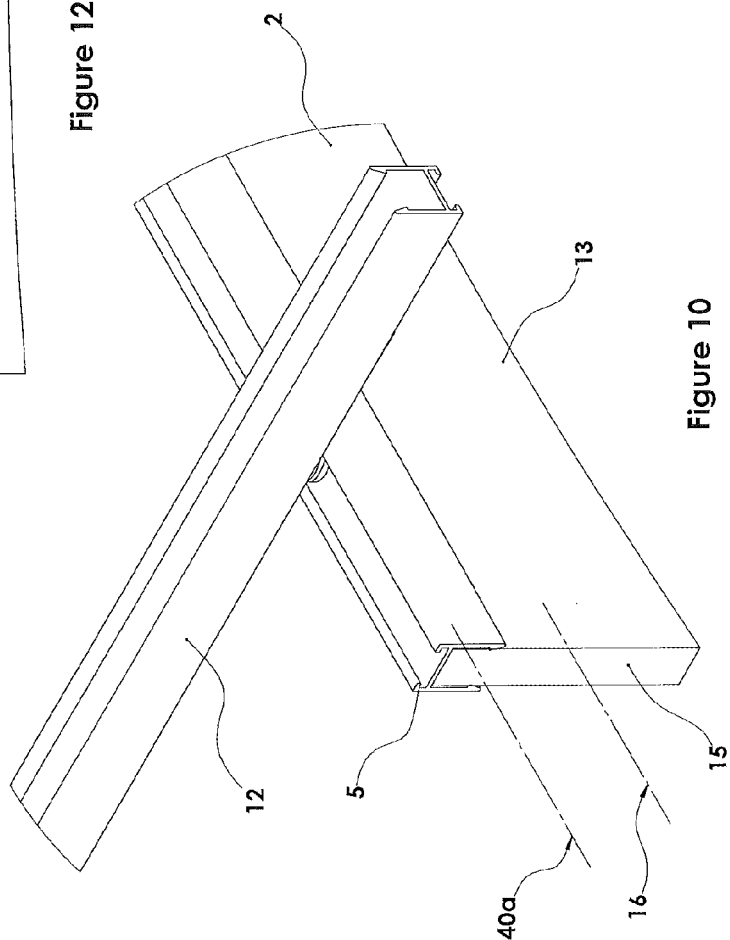
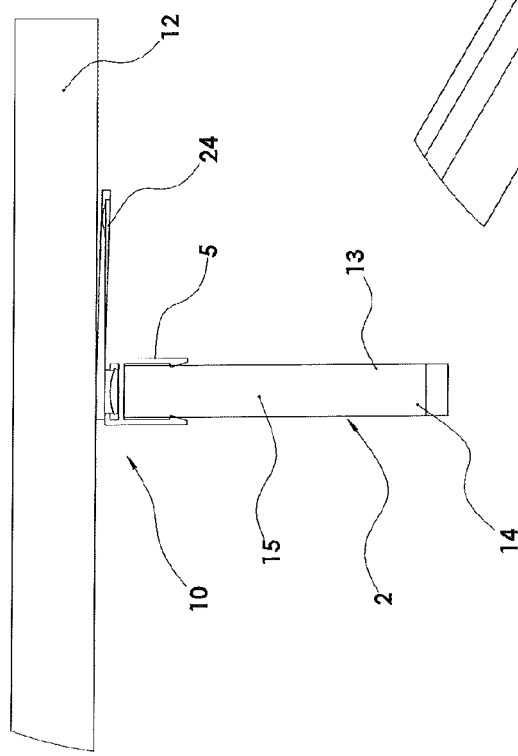

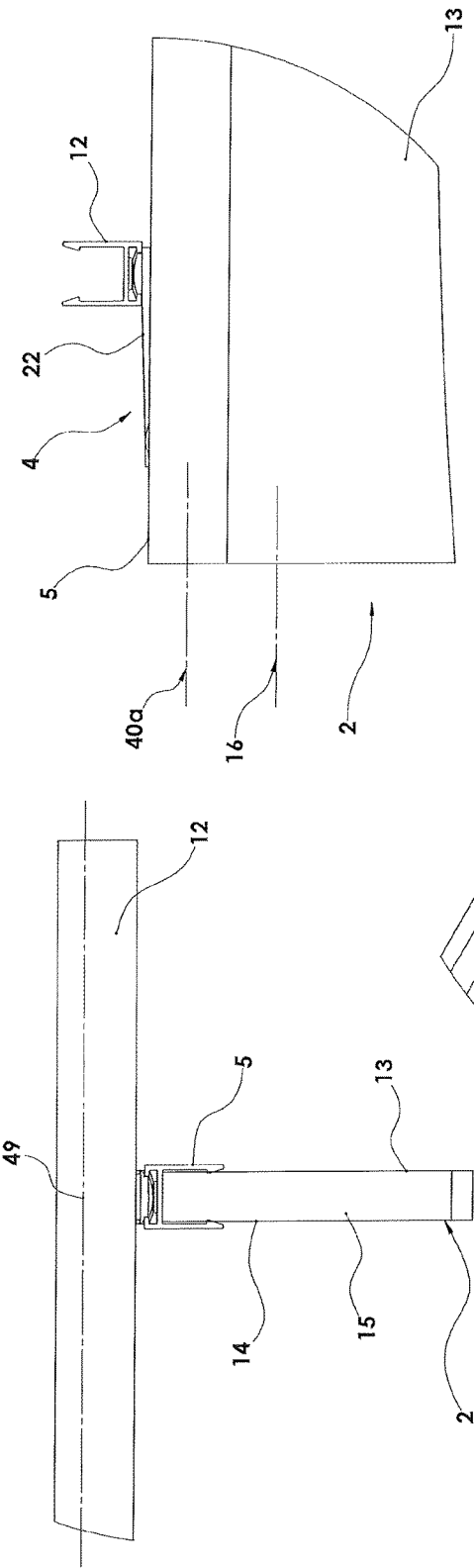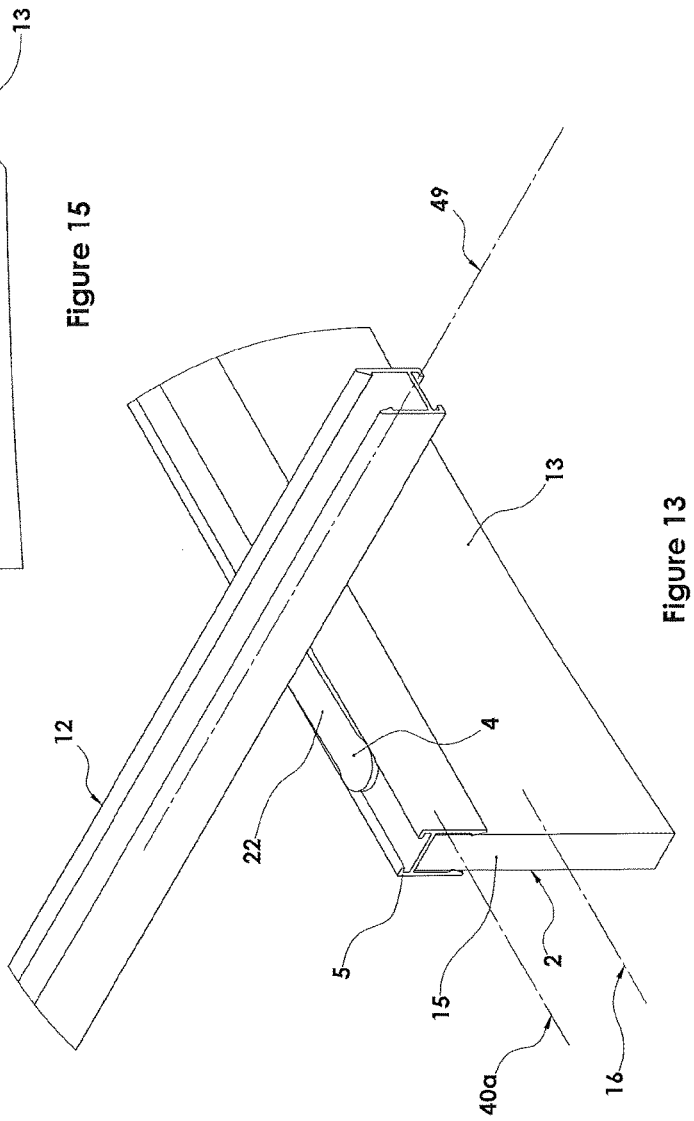

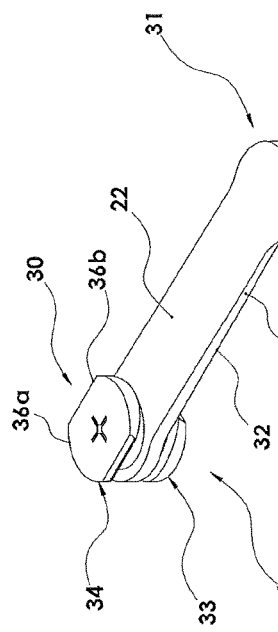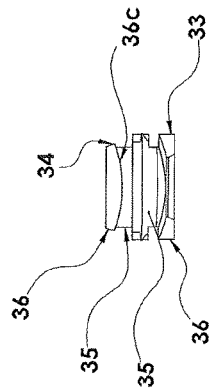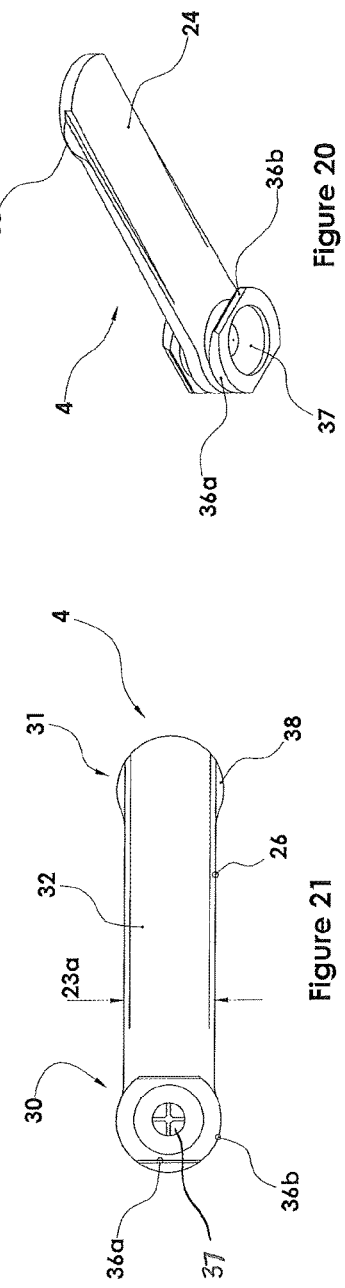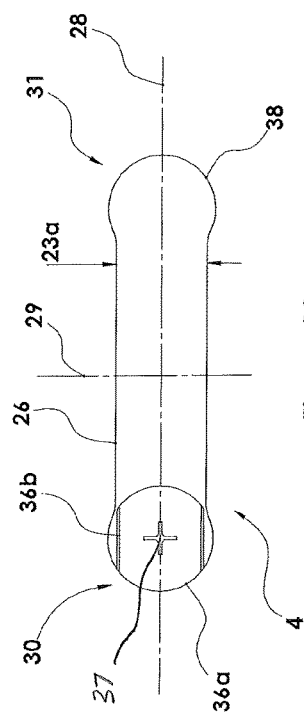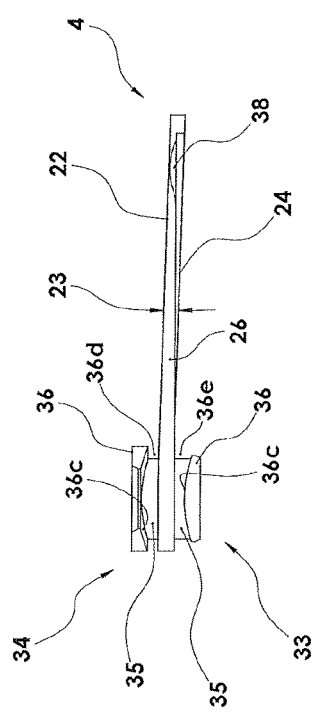
Figure 19
Figure 24
Figure 20
Figure 23
Figure 22
Figure 21

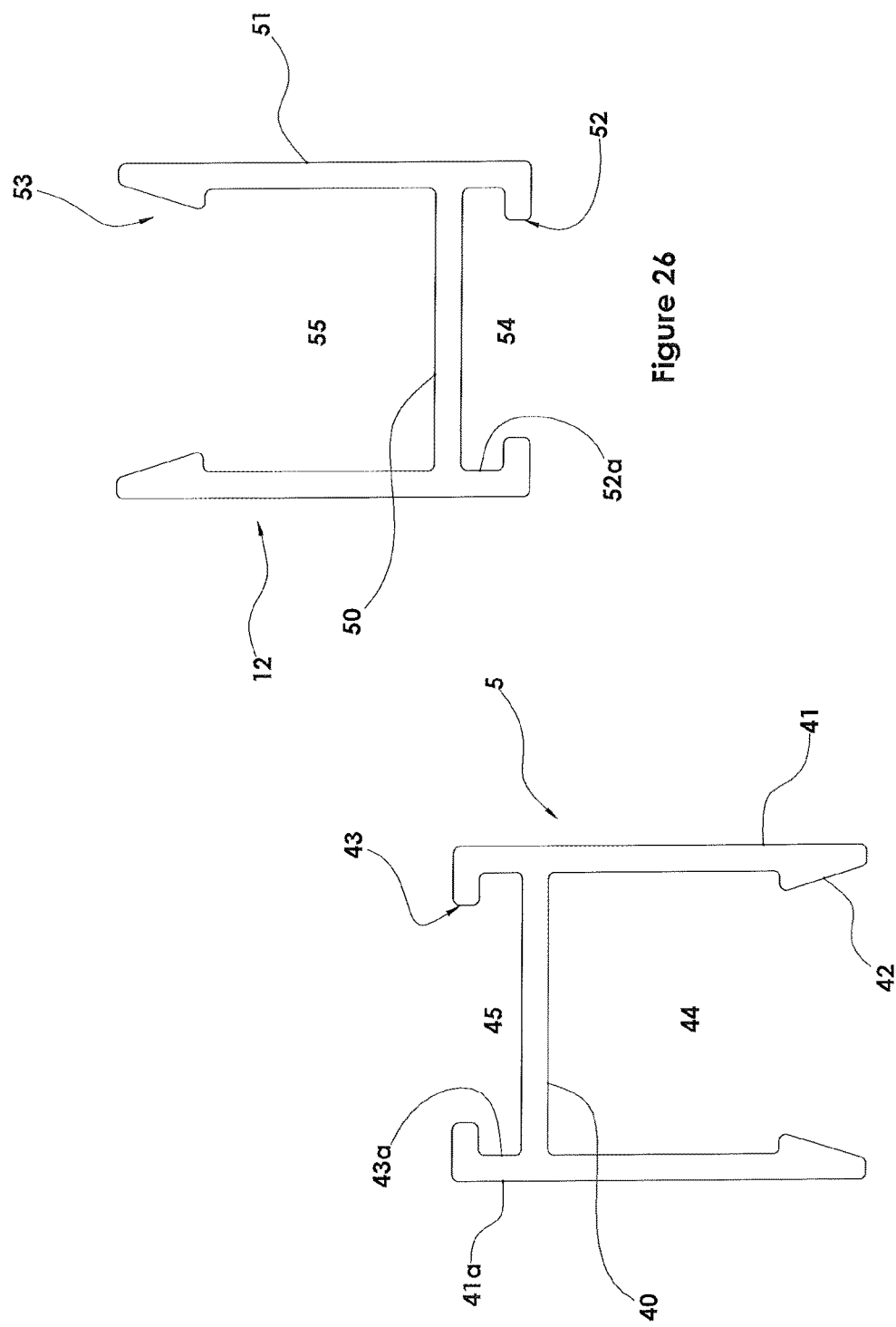

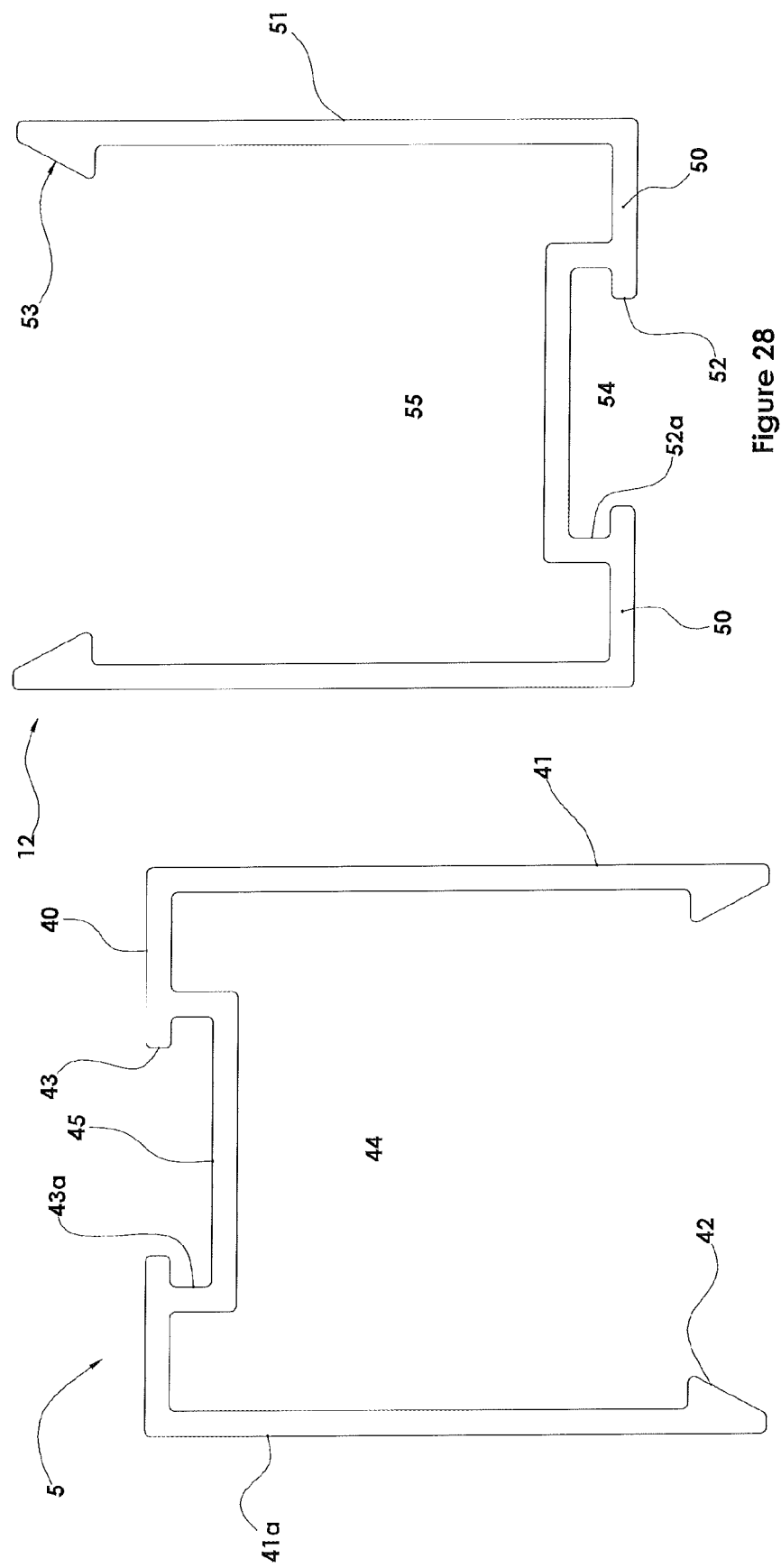

PANEL FIXING ASSEMBLY

The present invention relates to a panel fixing assembly and to a connector, for attaching a panel member or part of a panel member to a support structure or part of an overhead support structure and to some methods of installation. The invention is directed particularly but not solely towards a panel fixing assembly for an acoustic or decorative fin ceiling panels attached to an under side of a roof structure or to the walls of a building.

BACKGROUND OF INVENTION

In this example, ceiling panels can be arranged in different orientations to suit certain design requirements in regard to certain physical constrains such as roof to ceiling to floor dimension specifications. Most ceilings are oriented in the traditional horizontal orientation and are usually formed as suspended ceilings. Ceiling panels are slidably inter-fitted in a suspended grid like structure which is itself, vertically supported at various spaced positions by vertical wire members to the inside of a roof structure.

By saying "ceiling" does not necessarily mean a planar continuous structure but can mean any pattern or form is possible such as staggered panels or panels with spaces there between or panels oriented in any angle both regular or irregular in overall shape.

However there is a need to provide other orientations for the panels which are not necessarily horizontal or vertical. Other orientations may be needed for certain space requirements or for aesthetic design requirements and/or for acoustic design needs. One example of another ceiling orientation, is the need to suspend the panels in a vertical orientation whereby the panels can be called fin panels. This is very difficult to do. Existing methods include using the same vertical wires as mentioned above which means requiring many wires with many upper and lower fixing which is both time consuming and expensive to do. Fixing to an in use upper or top end of each fin panel is also problematic, being difficult and fiddly to do and do so in a stable manner. This type of fixing is traditionally affixed to an overhead support structure.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT OF THE INVENTION

It is an object of the invention to provide an improved panel fixing assembly, a connector and method of installation that ameliorates some of the disadvantages and limitations of the known art or at least provide the public with a useful choice.

SUMMARY OF INVENTION

In a first aspect the invention comprises a connector 4 for connecting a panel member 2 to an overhead support structure 3, the connector 4 including an elongate planar body with a first planar surface 22 and second planar surface 24 separated by a thickness dimension 23, having side edges 26 and end edges 27 whereby the side edges 26 define a longitudinal direction 28 parallel with its length and the end edges define an transverse direction 29 all being in use in a horizontal plane, each end of the elongate body includes a first end portion 30 and second end portion 31 separated by a middle portion 32, end portion 30 comprises an enlarged partially rounded shape, wherein the first end portion 30 is a fixing portion and the second end portion 31 is a locating portion, the fixing portion includes fixing means to removably affix one connector 4 to the panel capping member 5 or overhead support structure 3, wherein the fixing portion includes a first camming body 33 extending outwardly at right angles to the longitudinal direction 28 in a vertical direction from one of the first 22 or second 24 planar surface and the camming body 33, 34 includes a base portion 35 extending in one direction from the first end portion 30, leading to a platform portion 36 being spaced from the planar surface 22, 24 of the elongate planar body forming at least one recessed gap 36e for the locating of camming surfaces 36c and the fixing portion also includes a further fixing means to affix the connector to the overhead support structure 3 or to the panel capping member.

Preferably the further fixing means includes a second camming body 34 extending at right angles to the longitudinal direction 28 in a vertical direction from one of the second 24 and first 22 planar surfaces, the camming body 33, 34 includes a base portion 35 extending in another direction from the first end portion 30, leading to a platform portion 36 being spaced from the planar surface 22, 24 of the elongate planar body and the first and second camming bodies 33, 34 are co-linear with each other.

Preferably each platform portion 36 of the connector 4 includes a body with an outer planar surface and inner surface, wherein the camming surface 36c is located on the inner surface and comprises a contoured portion, rising and falling towards the first or second end portions 30, 31 of the elongate planar body whereby the camming surfaces 36c of one platform portion 36, face the camming surfaces 36c of the adjacent platform portion at the fixing portion of the connector 4 but are separated by the base portion 35 on each face of an end portion of the elongate body of the connector 4 and centrally by end portion 30, forming an upper and lower recessed gaps 36d and 36e between the sides of one base portion 35 and camming surface and end face of the elongate planar body.

Preferably the fixing portion is adapted to in use be first located and then fixed to the overhead support structure 3 or cross support member 12 and panel capping member 5, and the locating portion is adapted to provide a handle to operate by rotation of the connector 4 about the fixing portion to cause connecting or disconnecting.

Preferably each camming surface 36c includes at least one separated pair of continuous rising and falling portions per camming body 33, 34 located on opposite sides of the end portion of elongate body of the connector 4 which are firstly of the first camming body 33 are positioned parallel with the side edges 26 and are secondly in the second camming body 34 positioned at right angles to the sides edges 26 wherein each camming surface includes a rising portion leading to a falling portion, leading to a rising portion leading to a falling portion, in a continuous contoured smooth shape.

Preferably each platform portion 36 has curved end edges 36a separated by truncated end edges 36b to facilitate locking and insertion of the platform portion 36 into the panel capping member 5 and to the cross support member 12 wherein the truncated end edges 36b of one of the camming bodies 33 are oriented at right angles to the other truncated end edges 36b of the other camming body 34 wherein the truncated end edges 36*b* are adapted to allow insertion in the panel capping member 5 and the curved end edges 36*a* which provide an extended shape when compared to the truncated end edges 36*b*, are designed to extend into and under a flange, hook or lip 43, 52, 87 of the panel capping member 5, overhead support structure 3 and cross support structure 12 wherein the orientation of the truncated end edges 36*b* and curved end edges 36*a* and the associated sequence of rising and falling portions, of each camming body 33, 34 can be oriented in parallel with each other but at right angles when comparing each camming body to the other camming body, to facilitate insertion and locking with a parallel oriented overhead support member 3 or cross support member 12 with regard to the orientation of the panel capping member 5 wherein the camming surfaces 36*c* are provided underneath the curved end edges 36*a* in the recessed gaps 36*d*, 36*e*, and are not formed as part of the truncated end edges 36*b* so that the truncated end edges 36*b* enable the fixing portion to be freely slid into place whereas the curved end edges 36*a* with camming surfaces 36*c* are only activated when the locating portion is rotated.

Preferably a width 23*a* of the elongate planar body of the connector, between the side edges 26 is selected to be less in width of the distance between the sides walls 41, 41*a* of the first and second recesses 44, 45, 54, 55 of the panel capping member 5 and cross support member 12, whereby the curved side edges 36*a* extend beyond the side edges 26.

Preferably a thickness 23 of the elongate planar body varies across the length of the elongate planar body having a thinnest end at the locating portion causing one of the planar surface 22 or 24 to be angled to facilitate location with the second recess 45 of the panel capping member 5 and first recess 54 cross support member 12.

Preferably the further fixing means includes at least one fixing aperture 37 which is provided through the fixing end and is shaped and adapted to slidably or threadingly receive at least one fastener 38 there through to and into the overhead support structure 3.

Preferably, the further fixing means includes at least one fixing aperture 37 which is provided through first camming body 33 through the cylindrical based portion of the elongate body and then through the second camming body 34.

Preferably, the locating portion which is distal to the fixing portion, comprises an enlarged partially rounded shape with a locating protrusion 38 extending at least in the vertical direction perpendicular from planar surface 24 of the elongate planar body at the end portion and is shaped to allow sliding or clipping into locking into a panel capping member 5.

Preferably when the locating portion is operated to cause rotation of the elongate body of the connector, the lower recessed gap 36*e* is adapted to grip at least a portion of the panel capping member 5 and the upper recessed gap 36*d* is adapted to grip at least a portion of the overhead support structure 3 or cross support member 12.

Preferably, the connector is rectangular in profile being formed from a metal or plastics material.

In a second aspect the invention comprises a panel fixing assembly which is configured and adapted to affix a panel member 2 to an overhead support structure 3, wherein the panel fixing assembly 1 includes at least one connector 4 and panel capping member 5, the panel capping member 5 can be affixed to one panel member 2 with more than one connector 4 movably connected between the panel capping member 5 and overhead support roof structure 3 utilizing suitable fasteners 8 to connect at least one ceiling panel therefrom wherein the connector 4 is for connecting a panel member 2 to the overhead support structure 3, and the connector 4 includes an elongate planar body with a first planar surface 22 and second planar surface 24 separated by a thickness dimension 23, having side edges 26 and end edges 27 whereby the side edges 26 define a longitudinal direction 28 parallel with its length and the end edges define an transverse direction 29 all being in use in a horizontal plane, each end of the elongate body includes a first end portion 30 and second end portion 31 separated by a middle portion 32, end portion 30 comprises an enlarged partially rounded shape, wherein the first end portion 30 is a fixing portion and the second end portion 31 is a locating portion, the fixing portion includes fixing means to removably affix one connector 4 to the panel capping member 5 or overhead support structure 3, wherein the fixing portion includes a first camming body 33 extending outwardly at right angles to the longitudinal direction 28 in a vertical direction from one of the first 22 or second 24 planar surface and the camming body 33, 34 includes a base portion 35 extending in one direction from the first end portion 30, leading to a platform portion 36 being spaced from the planar surface 22, 24 of the elongate planar body forming at least one recessed gap 36*e* for the locating of camming surfaces 36*c* and the fixing portion also includes a further fixing means to affix the connector to the overhead support structure 3 or panel capping member 5.

Preferably the further fixing means includes a second camming body 34 extending at right angles to the longitudinal direction 28 in a vertical direction from one of the second 24 and first 22 planar surfaces, each camming body 33, 34 includes a base portion 35 extending in another direction from the first end portion 30, leading to a platform portion 36 being spaced from the planar surface 22, 24 of the elongate planar body and the first and second camming bodies 33, 34 are co-linear with each other.

Preferably, the ceiling panel member 2 is a planar member being a fin panel adapted to be affixed in an in use substantially vertical position wherein each fin panel has a first planar surface 13 separated from a second planar surface 14 by edges 15 defining a longitudinal direction 16 parallel with its planar surfaces 13, 14.

Preferably, the panel capping member 5 is shaped having an elongate body having a length also defining a longitudinal direction 40*a*, the panel capping member 5 comprising a channel cross section including a base member in the form of cross bar 40 between side walls 41, a first hook 42 and second hook 43, one side of the cross bar 40 between side walls 41 defines a first recess 44 and the other side of the cross bar 40 defines a second recess 45, the first recess 44 includes side walls 41 ending in a first hook 42 which comprises a truncated pointed end, a second recess 45 includes a space of smaller depth and volume than the first recess 44 and includes side walls ending in the second hook 43 with inner camming surfaces therein which comprise a right angle portion facing inwardly of the second recess 45.

Preferably the cross bar 40 is formed as a straight or planar member forming an H cross section with cross bar being located closer to one end.

Alternatively, the cross bar 40 is formed as a stepped member whereby there is formed a channel cross section forming the first recess with the second recess being recessed into the cross bar 40 to protrude within the first recess and not outwardly beyond.

Preferably the fixing portion is adapted to in use be first located and then fixed or connected to the overhead support structure 3 or cross support member 12 and panel capping member 5, and the locating portion is adapted to provide a handle to operate by rotation of the connector 4 about the fixing portion to cause connecting or disconnecting.

Preferably each platform portion 36 of the connector 4 includes a body with an outer planar surface and inner surface, wherein the camming surface 36c is located on the inner surface and comprise a contoured portion, rising towards the first or second end portions 30, 31 whereby the camming surfaces 36c of one platform portion, face the camming surfaces of the adjacent platform portion at the fixing portion of the connector 4 but are separated by the base portion 35 on each side of an end portion of the elongate body of the connector 4 and centrally by end portion 30, forming an upper 36d and lower recessed gap 36e between the sides of one base portion 35 and camming surface 36c and end face of the elongate planar body.

Preferably each camming surface 36c includes two separated pairs of continuous rising and falling portions per camming body 33, 34 located on opposite sides of the end portion of elongate body of the connector 4 which are firstly of the first camming body 33 are positioned parallel with the side edges 26 and are secondly in the second camming body 34 positioned at right angles to the sides edges 26 wherein each camming surface includes a rising portion leading to a falling portion, leading to a rising portion leading to a falling portion, in a continuous contoured smooth shape.

Preferably each platform portion 36 has curved end edges 36a separated by truncated end edges 36b to facilitate locking and insertion of the platform portion 36 into the panel capping member 5 and to the cross support member 12 wherein the truncated end edges 36b of one of the camming bodies 33 are oriented at right angles to the other truncated end edges 36b of the other camming body 34 wherein the truncated end edges 36b are adapted to allow insertion in the panel capping member 5 and the curved end edges 36a which provide an extended shape when compared to the truncated end edges 36b, are designed to extend into and under a flange, hook or lip 43, 52, 87 of the panel capping member 5, overhead support structure 3 and cross support structure 12 wherein the orientation of the truncated end edges 36b and curved end edges 36a and the associated sequence of rising and falling portions, of the camming body for each camming body can be oriented in parallel with each other to facilitate insertion and locking with a parallel oriented overhead support member 3 or cross support member 12 with regard to the orientation of the panel capping member 5 wherein the camming surfaces 36c are provided underneath the curved side edges 36a and not with the truncated end edges 36b so that the truncated end edges 36b enable the fixing portion to be freely slid into place whereas the curved end edges 36a with camming surfaces 36c are only activated when the locating portion is rotated.

Preferably a width 23a between the side edges 26 is selected to be less in width of the distance between the sides walls 41, 41a of the first and second recesses 44, 45, 54, 55 of the panel capping member 5 and cross support member 12, whereby the curved end edges 36a extend beyond the side edges 26.

Preferably a thickness 23 of the elongate body of the connector varies across the length of the elongate body having a thinnest end at the locating portion causing one of the planar surface 22 or 24 to be angled to facilitate location with the second recess 45 of the panel capping member 5 and first recess 54 cross support member 12.

Preferably the further fixing means includes at least one fixing aperture 37 which is provided through the fixing portion and is shaped and adapted to slidably or threadingly receive at least one fastener 38 there through to and into the overhead support structure 3.

Preferably, the further fixing means includes at least one fixing aperture 37 which is provided through first camming body 33 through the base portion 35 of the elongate body and then through the second camming body 34.

Preferably, the locating portion which is distal to the fixing portion, comprises an enlarged partially rounded shape with a locating protrusion 38 (similar to 36a) also extending at least in the vertical direction perpendicular from the planar surface 24 of the elongate body at the end portion and is shaped to allow sliding and/or clipping into locking into a panel capping member 5.

Preferably when the locating portion is operated to cause rotation of the elongate body of the connector, the lower recessed gap 36e is adapted to grip at least a portion of the panel capping member 5 or the upper recessed gap 36d is adapted to grip at least a portion of the overhead support structure 3 or the cross support member 12.

Preferably, the connector 4 is rectangular in profile being formed from metal or plastics material.

Preferably, the overhead support structure 3 can include any type of support structure that is able to support the ceiling panel assembly 1 and 10 wherein the overhead support structure provides a downwardly facing support surface 20 for abutment and affixing of the ceiling panel fixing assembly.

Preferably there are several connectors 4 movably supported between each panel capping member 5 and overhead support structure 3.

Preferably, the panel capping member 5 is attached to one panel edge of a panel member 2 to be affixed thereon, the connectors 4 with fasteners 8 are fastened to the overhead support structure 3 in spaced apart spacing, each connector 4 having a longitudinal direction 28 is firstly oriented for insertion, to be at right angles to the longitudinal direction 28 of the panel capping member 5 with the truncated end edges 36b parallel with the longitudinal direction 16 of the panel capping member 5 leaving a downwardly exposed first camming body 33, at least one panel captures the first camming body 33 leaving the middle portion 32 and second end portion exposed 31 so that the middle portion 32 and second end portion 31 are then secondly to fix are rotated to a right angle position with regard to the longitudinal direction 16 of panel capping member 5 to be parallel with the longitudinal plane 40a of the panel member 2 and panel copping member 5 and the locating protrusion 38 of second locating end portion 31 is clipped into second recess 45 of the capping member 5.

Preferably a cross support member 12 is supported and connected between the overhead support structure 3 and panel capping member 5 wherein the cross support member 12 is an elongate shaped member with its own longitudinal direction which in use is oriented at right angles to the longitudinal direction of the panel capping member 5 and panel member 2.

Preferably the elongate member of the cross support member 12 is provided with a cross section including a channel cross section with a base 50 and side walls 51 with a first recess there in, wherein the base 50 extends between the side walls formed as an L shape having a restricted opening to the first recess wherein the first recess therein shaped and configured to slidably receive the second cam body 34 of at least one connector 4

Preferably, the channel cross section is part of an H cross section wherein there is a second recess on the other side of the base 50 which is adapted to receive fasteners 8 to the overhead support structure 3.

Alternatively the channel cross section is U shaped channel whereby the first recess is recessed within the base.

Preferably the assembly includes a connection tab member 60 comprising an elongate planar member having a centrally located transverse rib 68 located peripherally at least on an upper and lower surfaces and having a thickness, when the connection tab member 60 is interfitted in the assembly by being slidably received in an abutting second recess of opposing ends of panel capping members 5 and the transverse ribs 68 abut the ends of the panel capping members 5 separating the ends of the panel capping members 5 from each other by at least substantially the thickness of the transverse ribs 68.

Preferably the assembly includes at least one bracket clip member 13 including a first bracket clip member for fixing the panel capping member 5 to the overhead support structure 3, comprises a body with an L shape in cross section having a first leg 71 and second leg 72 joined by a corner portion 73, formed as a planar body having sides 76, ends 77, a width 80 between sides 76 and at least one aperture 90 whereby in use the first leg 71 is a vertical leg and the second leg 72 is a horizontal leg, the corner portion 73 includes notches 85 on both sides 76 wherein the second leg 72 is sized and oriented to slidably interfit within the second recess 45 formed of flanges with inwardly facing lips 87 forming a narrow gap there between of the panel capping member 5 wherein the notches 85 interfit with the lips 87 such that fasteners can be inserted through each aperture 90 for fixing.

Preferably the second leg 72 is adapted to lap and be fixed with a first leg of a second bracket clip member 13 thereby presenting a second leg 72 parallel with the second leg of the first bracket clip member forming in cross section a square U shaped oriented on its side.

In a third aspect the invention comprises a method of installing a panel fixing assembly wherein the assembly comprises a panel fixing assembly which is configured and adapted to affix a panel member 2 to an overhead support structure, the panel fixing assembly 1 includes at least one connector 4 and panel capping member 5, the panel capping member 5 is affixed to one panel member 2 with at least one connector 4 movably attached between the panel capping member 5 and overhead support structure 3 utilizing suitable fasteners 8 to support at least one panel therefrom, the connector 4 are for connecting a panel member 2 to an overhead support structure, the connector 4 including an elongate planar body with a first planar surface 22 and second planar surface 24 separated by a thickness dimension 23, having side edges 26 and end edges 27 whereby the side edges 26 define a longitudinal direction 28 parallel with its length and the end edges define an transverse direction 29 all being in use in a horizontal plane, each end of the elongate body includes a first end portion 30 and second end portion 31 separated by a middle portion 32, each end portion 30 and 31 comprise an enlarged partially rounded shape, wherein the first end portion 30 is a fixing portion and the second end portion 31 is a locating portion, the fixing portion includes fixing means to removably affix one connector 4 to the panel capping member 5 or overhead support structure, wherein the fixing portion includes a first camming body 33 extending outwardly at right angles to the longitudinal direction 28 in a vertical direction from one of the first 22 or second 24 planar surface and each camming body 33, 34 includes a base portion 35 leading to a platform portion 36 being spaced from the planar surface 22, 24 of the elongate planar body forming at least one recessed gap 36e for the location of the camming surfaces 36c and the fixing portion also includes a further fixing means to affix the connector to the overhead support structure 3 or panel capping member 5, wherein the method includes the following steps of:

first attach the panel capping member 5 to one panel edge of one panel member 2 to be affixed thereon leaving a second recess 45 protruding;

fasten connectors 4 with fasteners 8 to underside or surface 20 of the overhead support structure 3 in spaced apart spacing whereby second camming body abuts surface 20;

orient or firstly rotate each connector 4 having a longitudinal direction 28 to be at right angles to the longitudinal direction panel member 16 and longitudinal direction 40a of the panel capping member 5 with the truncated side edges parallel with the longitudinal direction 16 of the panel member 2 leaving a downwardly exposed first camming body 33;

bring one panel member 2 with panel capping member 5 thereon, up to meet so that second recess 45 of the panel capping member 5 captures the first camming body 33 leaving the middle portion 32 and second end portion 31 exposed to slide the fixing portion into position;

in a second rotation of the connector 4 about the first end portion 30, rotate the middle portion 32 and second end portion 31 from a right angle position with regard to the longitudinal direction 40a of panel capping member 5 to then be in parallel with the longitudinal direction 16 of the panel member 2 and longitudinal direction 40a panel capping member 5 whereby the camming surfaces 36c of the connector cam with the camming surfaces 43a of the second recess 45 of the panel capping member 5;

clip the locating protrusion 38 and middle portion 32 of the second locating end portion 31 into a second recess 45 of the panel capping member 5.

Preferably before attaching any connectors 4, a cross support member 12 can be supported and connected between the overhead support structure 3 and panel capping member 5 wherein the cross support member 12 is an elongate shaped member with its own longitudinal direction which in use is oriented at right angels to the longitudinal direction of the panel capping member 5 and panel member 2, and the elongate member of the cross support member 12 is provided with a cross section including a channel cross section with a base and side walls with a first recess there in, wherein the base is a cross bar and the side walls formed as an L shape having a restricted opening to the first recess wherein the first recess therein shaped and configured to slidably receive the second cam body 34 of at least one connector 4.

Preferably after connecting one panel member 2 with at least one connector 4 to the overhead support structure 3, connection tab members 60 can be used to end connect more panel members also connected by connectors to the overhead support structure 3.

Preferably after connecting one panel member 2 with at least one connector 4 to the overhead support structure 3, at least one bracket clip member 13 can be used to removably connect between and to, the panel capping member 5 and overhead support structure 3.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

BRIEF DESCRIPTION

The invention will now be described, by way of example only, by reference to the accompanying drawings:

Fin Panels Attached Directly to an Overhead Support Structure

FIG. 1 is a perspective view of the panel fixing assembly not attached to an overhead support structure, in an unlocked position, in accordance with a first preferred embodiment of the invention.

FIG. 2 is an end cross sectional view of the panel fixing assembly directly attached to an overhead support structure in an unlocked position.

FIG. 3 is a side view of the assembly of FIG. 2.

FIG. 4 is a perspective view of the ceiling panel fixing assembly not attached to an overhead support structure, in a locked position.

FIG. 5 is an end cross sectional view of the panel fixing assembly directly attached to an overhead support structure in a locked position.

FIG. 6 is a side view of the assembly of FIG. 5.

FIG. 7 is a series of end cross sectional views of the steps to install the panel assembly.

FIG. 8 is a top plan view of the steps shown in FIG. 7.

FIG. 9 is a perspective view of the steps of installation as shown in FIGS. 7 and 8.

Fin Panels Attached to a Cross Beam Member

FIG. 10 is a perspective view of the panel fixing assembly attached to an overhead beam support structure, in an unlocked position, in accordance with a second preferred embodiment of the invention.

FIG. 11 is a cross sectional end view of the assembly of FIG. 10.

FIG. 12 is a side view of the assembly of FIG. 11.

FIG. 13 is a perspective view of the assembly of FIG. 10 but in a locked position.

FIG. 14 is a cross sectional end view of the assembly of FIG. 11 but in a locked position.

FIG. 15 is a side view of the assembly of FIG. 12 but in a locked position.

FIG. 16 is a cross sectional end view of the installation steps from an unlocked to locked position, from left to right.

FIG. 17 is a top plan view of the installation steps of FIG. 16.

FIG. 18 is a perspective view of installation steps of FIGS. 16 and 17.

FIG. 19 is an upper perspective view of the connector of the assembly.

FIG. 20 is a lower perspective view of the connector of FIG. 19.

FIG. 21 is a base plan view of the connector.

FIG. 22 is a side view of the connector.

FIG. 23 is a top plan view of the connector.

FIG. 24 is an end edge view of the connector.

FIG. 25 is a cross sectional view of the panel capping member.

FIG. 26 is a cross sectional view of the cross support member.

FIG. 27 is a cross sectional view of another panel capping member.

FIG. 28 is a cross sectional view of another cross support member.

FIG. 29 is a perspective view of the joining of two panel capping members before assembly.

FIG. 30 is a perspective view of one end of a connection tab member slidably inserted into one end of a panel capping member.

FIG. 31 is a perspective view of the joining of two panel capping members assembled with the connection tab member.

FIG. 32 is a perspective view of a bracket clip member 70 for use in attaching the overhead support structure to the panel capping member 5.

FIG. 33 is a perspective view of the bracket clip in use in a panel capping member 5.

FIG. 34 is a top plan view of the bracket clip member.

FIG. 35 is a side view of the bracket clip member.

FIG. 36 is an end view of the bracket clip member.

FIG. 37 is a perspective view of the two bracket clip members connected together.

FIG. 38 is a top plan view of the two bracket clip members of FIG. 37.

FIG. 39 is a side view of the bracket clip member of FIG. 38.

FIG. 40 is an end view of the bracket clip member of FIG. 39.

DESCRIPTION OF DRAWINGS

The following description will describe the invention in relation to preferred embodiments of the invention, namely a panel fixing assembly 1 and method of installation. The invention is in no way limited to these preferred embodiments as they are purely to exemplify the invention only and that possible variations and modifications would be readily apparent without departing from the scope of the invention. Of FIGS. 1-40, FIGS. 1-9 show a first embodiment of the invention, FIGS. 10-18 show a second embodiment of the invention, FIGS. 19-24 show a connector, FIG. 25 shows a cross section of the panel capping member 5 and FIG. 26 shows a cross section of the cross support member 12. FIGS. 27 and 28 show another embodiment of the panel capping member 5 and cross support members 12 and FIGS. 28-31 show one method of end joining two panel capping members 5.

FIGS. 1-9 show a panel fixing assembly 1 in a first embodiment which is configured and adapted to affix a panel member 2 to be affixed directly to an overhead support structure 3 such as for example a roof structure. The panel fixing assembly 1 includes at least one connector 4 and panel capping member 5. At least one panel capping member 5 is affixed to one end of a panel member 7 with more than one connector 4 movably attached between the panel capping member 5 and overhead support structure 3 utilizing suitable fasteners 8.

Figure 9:
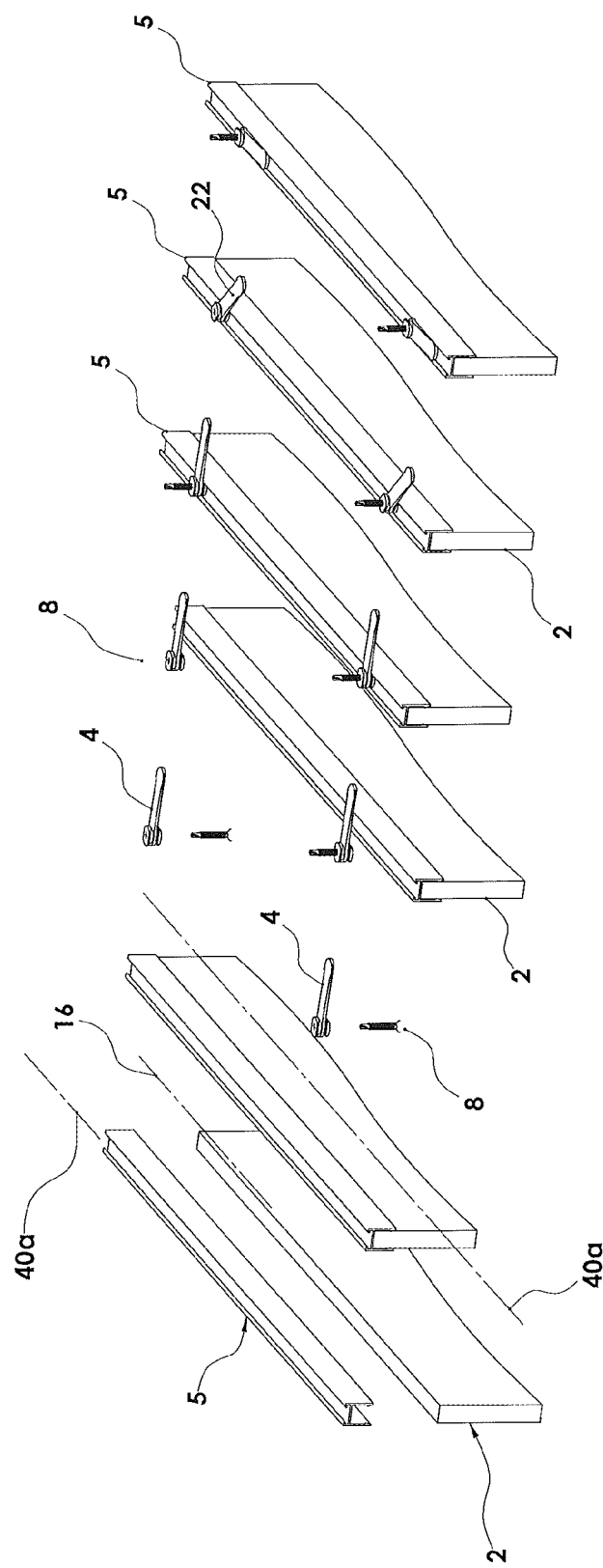
Figure 17:
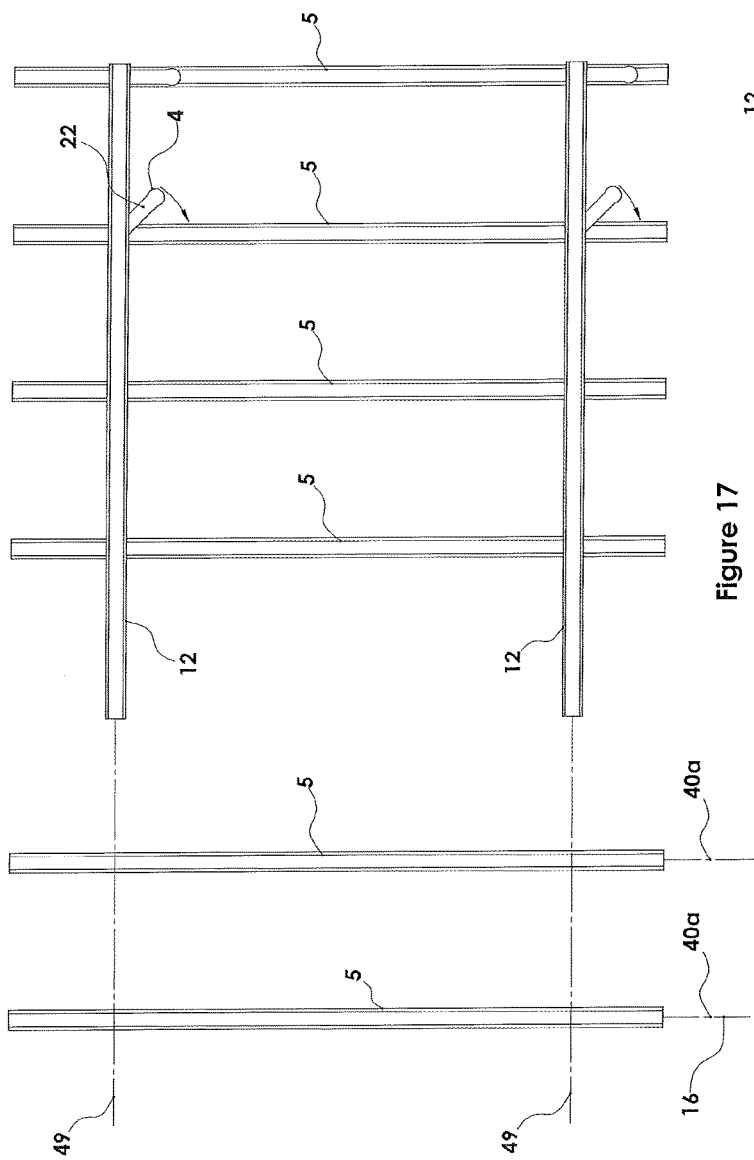
Figure 16:
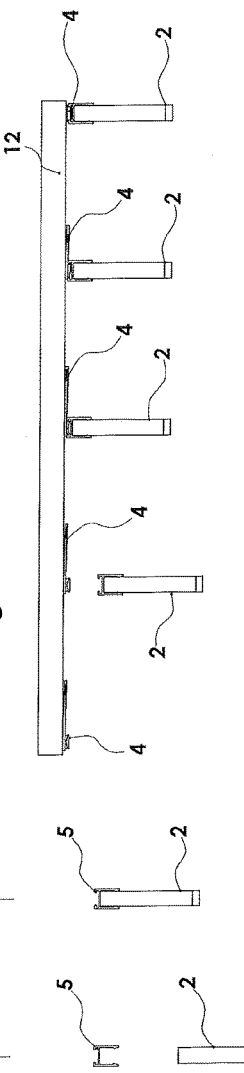
Figure 18:
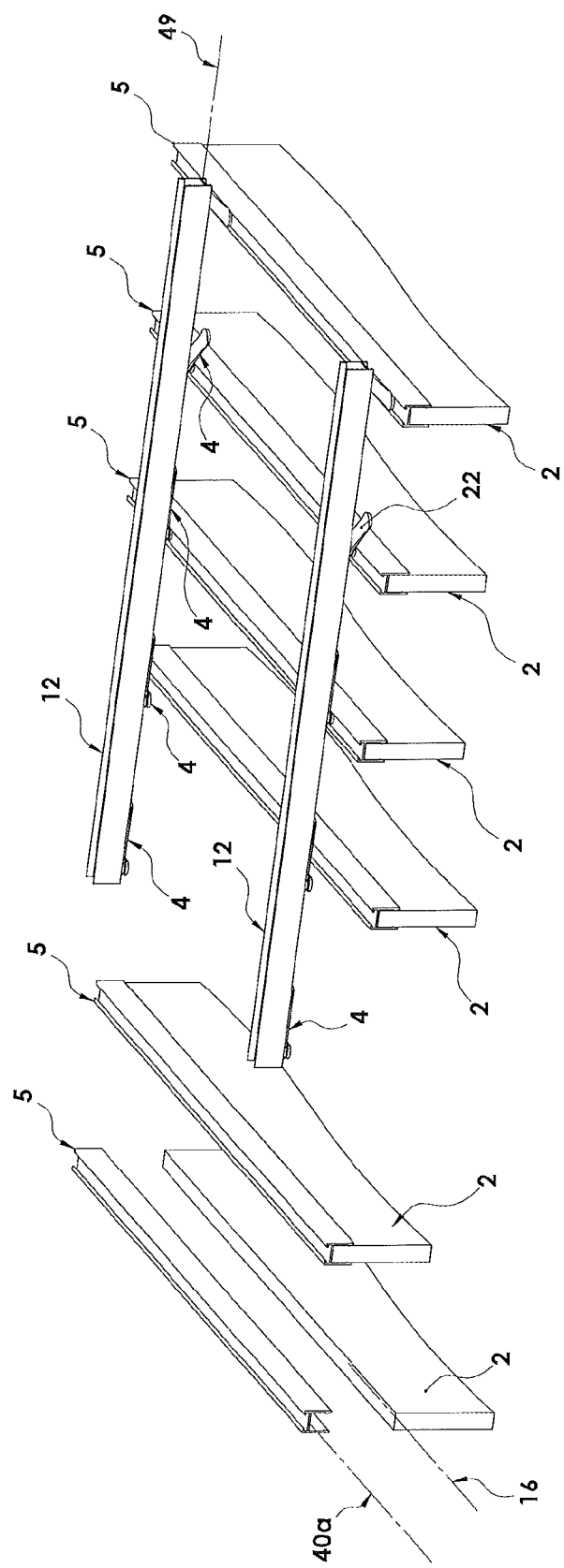

The connectors 4 are shaped and designed to be used in one plane eg horizontal plane to connect and/or support a panel member 2 which is oriented in another plane. It is the orientation between the connectors 4 and panel members which is more important than whether the connectors are truly horizontal or if the panels are truly vertical or not.

FIGS. 10-18 show a panel fixing assembly 10 in a second embodiment which is configured and adapted to affix a panel member 2 indirectly to overhead support structure 3. Each ceiling panel assembly 10 includes at least one connector 4, one panel capping member 5 and at least one cross support member 12 or overhead support structure 3. One panel capping member 5 is affixed to one panel member 7 and more than one connector 4 is movably connected between the panel capping member 5 and cross support member 12. Cross support member 12 is affixed underneath to the overhead support structure 3 to be connected to the connector 4.

In this example each panel member 2 can be a ceiling panel being a planar member being a fin panel adapted to be affixed in an in use substantially vertical position. Each panel member 2 has a first planar surface 13 separated from a second planar surface 14 by edges 15 defining a longitudinal direction 16 parallel with its planar surfaces 13, 14.

The overhead support structure 3 can include any type of support structure that is able to support the ceiling panel assembly 1 and 10. For example, the support structure might include an iron or steel panel roof cladding supported and affixed to an under frame or it can be concrete roof structure. The shape of the overhead support structure 3 can be for example, a pitch roof or lean to type roof but any such examples present a downwardly facing support surface 20 for abutment and affixing of the panel fixing assembly 1 and 10.

Each connector 4 as shown in FIGS. 19-24 includes an elongate body having a length, with a first planar surface 22 and second planar surface 24 separated by a thickness dimension 23. As seen in the figures, there are side edges 26 and end edges 27 whereby the side edge 26 are much closer together than the end edges 27 whereby the sides define a longitudinal direction 28 parallel with its length and the end edges define an transverse direction 29, to form an overall substantially rectangular planar strip like shape. Each end of the elongate body includes a first end portion 30 and second end portion 31 separated by a middle portion 32. End portion 30 comprises an enlarged partially rounded shape that extends beyond the side edges 26 and/or end edges 27 of the rectangular shape. End portion 31 can also have an enlarged partially rounded shape if required. In one use, first planar surface 22 can be oriented to be a top surface and second planar surface 24 can a bottom surface.

The fixing portion includes fixing means which includes a first camming body 33 (eg when in use can be a lower camming body as seen in FIGS. 19-23) extending at right angles to the longitudinal direction 28 in a vertical direction from one of the first 22 or second 24 planar surface, both extending from a base portion in different directions at the first end portion 30. The fixing portion can also include a second camming body 34 extending at right angles to the longitudinal direction 28 in a vertical direction from one of the second 24 and first 22 planar surfaces. When in use, the second camming body 34 can be an upper camming body. The first and second camming bodies 33, 34 are co linear with each other. Each camming body 33, 34 includes a base portion 35 (eg can be any shape like cylindrical and can be solid or hollow) leading to a platform portion 36 being distal to the planar surface 22, 24 of the elongate planar body forming at least one recessed gap 36d, 36e for the locating of camming surfaces 36c.

First end portion 30 is a fixing portion and second end portion 31 is a locating portion. The fixing portion is for removable fixing either to panel capping member 5 and/or to the overhead support structure 3 or cross support member 12. The locating portion is adapted to provide a handle to enable one to operate by rotation in a horizontal plane of the whole elongate planar body to rotate about the first end 30 whereby the camming surfaces 36c slide over or under spaced flanges of the panel capping member 5 to grip or not to grip.

Platform portion 36 includes an outer planar surface and inner surface. A camming surface 36c is provided on at least part of the inner surface. The inner camming surface 36c comprises a contoured continuous surface including spaced curved surface formed of smooth peaks and valleys, rising towards the first and second end portions 30, 31. In this example there can be two (there can be less or more) curved peak or convex shaped portions between curved valleys or concave portions per camming body 33 or 34 which are positioned firstly located parallel with the side edges 26 for one camming body 33 and secondly are located at right angles to the side edges 26 for the other camming body 34. However within each camming body 33 or 34, each pair of the convex and concave portions are parallel with each other.

Furthermore each platform portion 36 has curved end edges 36a separated by truncated end edges 36b to facilitate insertion and locking into the panel capping member 5 and cross support member 12. By saying 'end edges' is meant to include all or any part of the edges of the platform portion 36. The first camming body 33 has its curved end edges 36a and truncated end edges 36b either at right angles to the same edges of the second camming body 34 or they can be parallel with each other but with a centrally located end portion of the planar body between base portions 35 which each in turn lead to the platform portion 36 at each end of the base portions 35 located at the fixing portion. Because each cylindrical base portion 35 has a diameter or thickness less than the dimension of the platform portion 36 which forms an overhang there is the recessed gap between the side of each cylindrical base portion 35 and an under side of the platform portion 36 and one side of the end portion of the planar body portion which form an upper and lower spaced recessed gaps 36d and 36e being horizontally oriented slots. End portion 30 of the elongate planar body is located centrally between the base portions 35, which also includes an enlarged end edges similar to the curved end edges of the upper and lower camming bodies 33, 34.

The camming surfaces 36c of one platform portion 36 inwardly face the camming surfaces 36c of the adjacent platform portion 36 at the fixing portion of the connector 4 but are separated from each other (but are co-linear) by the cylindrical base portions 35 and an end portion of the elongate body located centrally there between the cylindrical base portions 35. The surfaces of the end portion of the planar body portion are not curved surfaces but are shaped as flat or level surfaces being parallel with the upper and lower surfaces 22, 24.

The camming surfaces 36c are provided underneath the curved end edges 36a and not as part of the truncated end edges 36b. Because the truncated end edges 36b have no camming surfaces 36c ie raised portions, this allows the fixing end of the connector 4 to be able to freely slide into position in a suitable recess of the panel capping member 5, overhead support structure 3 or cross support member 12. The action of sliding the fixing portion of the connector 4 into the panel capping member 5 having flanges, means that the camming surfaces 36c are not engaged and only when the locating end is rotated about the horizontal plane (eg ie when in use with a vertical oriented panel members 2), are the camming surfaces 36c forcibly slid under the flanges, hooks or lips (43, 52, 87) of the panel capping member 5 or cross support member 12 to be gripped therein the recessed gap 36d, 36e. The truncated end edges 36b are sized to slid in between the flanges/hooks 43, 52 of the panel capping member and cross support member The truncated end edges 36b can be formed by cutting off a portion of a round shape whereas the end edges of the end portion of the planar body portion have a rounded shape all around similar to the non-truncated end edges 36a having a diameter greater than the width 23a between side edges 26.

Each platform portion 36 has curved end edges 36a separated by truncated end edges 36b to facilitate locking and insertion of the platform portion 36 into the panel capping member 5 and to the cross support member 12 wherein the truncated end edges 36a of one of the camming bodies 33 are oriented at right angles to the other truncated end edges of the other camming body 34 wherein the truncated end edges are adapted to allow insertion in the panel capping member 5 and the curved side edges which provide an extended shape when compared to the truncated end edges, are designed to extend into and under a flange of the panel capping member 5, overhead support structure 3 and cross support structure 12. The orientation of the truncated end edges 36b and curved end edges 36a and the associated sequence of rising and falling portions, of each camming body can be oriented in parallel with each other to facilitate insertion and locking with a parallel oriented overhead support member 3 or cross support member 12 with regard to the orientation of the panel capping member 5.

The right angle (or parallel or any angle) orientation of the truncated end edges 36b of each connector 4, can be made to match the same orientation of the overhead support structure 3 and cross support members 12 with the panel capping members 5 and aid in easier insertion and provide a one action rotation to turn the truncated end edges 36b and curved end edges 36a to lock in under all the flanges (eg hooks 42, 52, 43, lips 87) of the panel capping members 5 and cross support members 12. This matching of edges of the connector and other members as mentioned is useful but is not essential as any angle or parallel can also still work to allow insertion or sliding or clipping and then rotation to grip or connect or affix.

The fixing means can also include at least one fixing aperture 37 which is provided completely or at least partially through the fixing end or through the first camming body through end portion of the elongate body and then through the second camming body, and is shaped and adapted to slidably or threadingly receive at least one fastener 38 there through to and into the overhead support structure 3. This fixing means can be used in combination with both the first and second camming bodies or in combination without the second (in use upper) camming body 34.

The locating portion which is distal to the fixing portion, comprises a locating protrusion 38 also extending at least in a vertical direction perpendicular from the planar surface of the elongate body at the end portion and is shaped to allow sliding or clipping into the panel capping member 5. Locating protrusion 38 is similar to the curved side edges 36a of the fixing portion but can extend at least a portion or as shown as extending peripherally in a circle in plan or base view.

As seen in detail in FIG. 25, panel capping member 5 (as seen in the cross section of FIG. 25) is shaped having an elongate body having a length also defining a longitudinal direction 40a. The panel capping member 5 comprising a channel cross section which can be an H cross section including a base being from as a cross bar 40 which is planar in extent, between side walls 41, a first hook 42 and second hook 43. One side of the cross bar 40 between side walls 41 defines a first recess 44 and the other side of the cross bar 40 defines a second recess 45. First recess 44 includes side walls 41 ending in first hook 42 which comprises a truncated point end. Second recess 45 includes a space of smaller depth and volume than the first recess 44 and includes side walls ending in the second hook 43 with at least a port of an inner surface being an inner camming surfaces 43a therein which comprise a right angle portion facing inwardly of the second recess 45.

FIG. 27 shows another embodiment of the panel capping member 5 which is also a channel cross section but this time is substantially U shaped with the second recess 45 located within the first recess 44 to not protrude outwardly of the base 40 on the opposite to the first recess 44.

Cross support member 12 is shown in FIG. 26 and includes an elongate shaped member having a length defining a longitudinal direction 49 parallel with its length. The elongate shaped member includes a similar channel cross section to the panel capping member 5 but is oriented when in use, in an opposite configured orientation. Cross support member 12 is shaped having an elongate body comprising an H cross section including a base being a planar shape member in the form of a base 50 between side walls 51, a first hook 52 and second hook 53. One side of the base 50 between side walls 51 defines a first recess 54 and the other side of the base 50 defines a second recess 55. First recess 54 includes side walls 51 ending in the first hook 52 which comprise a right angle portion facing inwardly of the first recess 55 and an inner surface. At least a portion of the inner surface can include camming surfaces 52a. Second recess 55 includes a space of larger depth and volume than the first recess 54 and includes side walls ending in second hook 53 which comprises a truncated point end.

Minimally cross support member 12 needs only the first recess 54 and the cross bar 50 in that suitable fasteners can be attached through a fixing aperture (not shown) through the cross bar 50 and into the overhead support structure 3.

FIG. 28 shows another embodiment of the cross support member 12 which is also a channel cross section but this time is substantially U shaped with the first recess 54 located within the second recess 55 to not protrude outwardly of the base 50 on the opposite to the second recess 55.

The width 23a between the side edges 26 of each connector 4 is selected to be less in width than the distance between the sides walls 41, 41a of the first and second recesses 44, 45, 54, 55 of the panel capping member 5 and cross support member 12, whereby the curved side portions 36a extend beyond the side edges 26. The thickness of the elongate body varies across the length of the elongate body having a thinnest end at the locating portion causing one of the planar surface 22 or 24 to be angled to facilitate location with the second recess 45 of the panel capping member 5 and first recess 54 cross support member 12.

Figure 29:
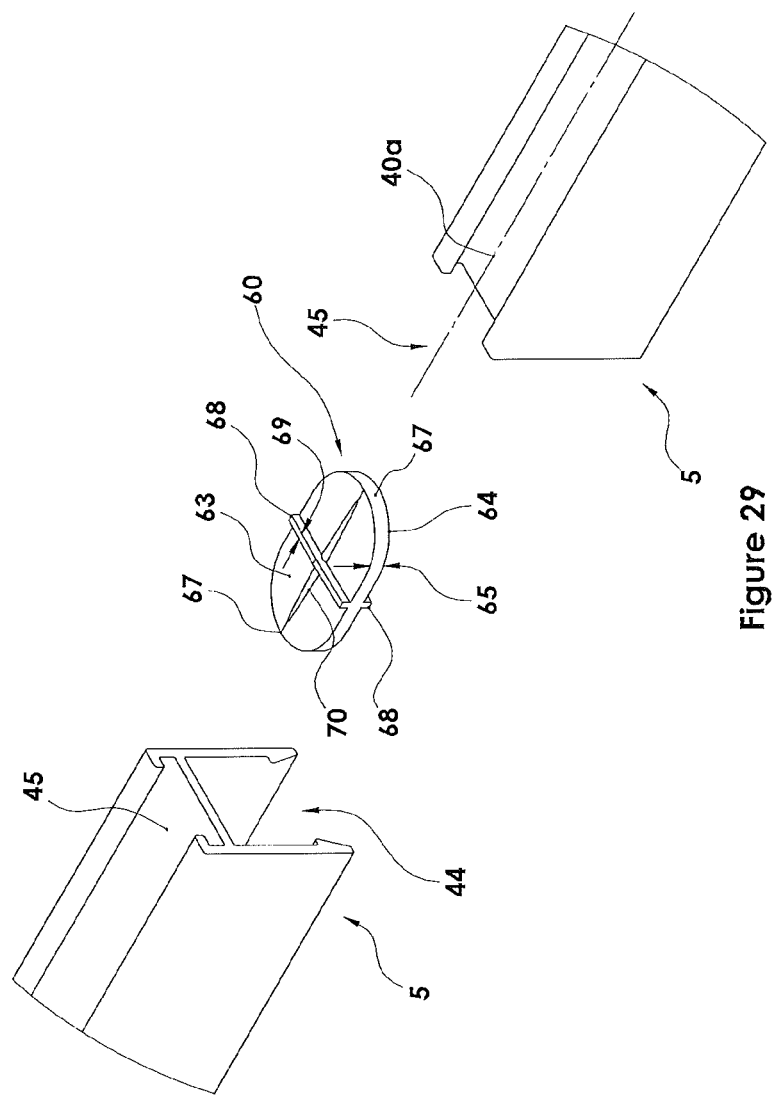
Figure 31:
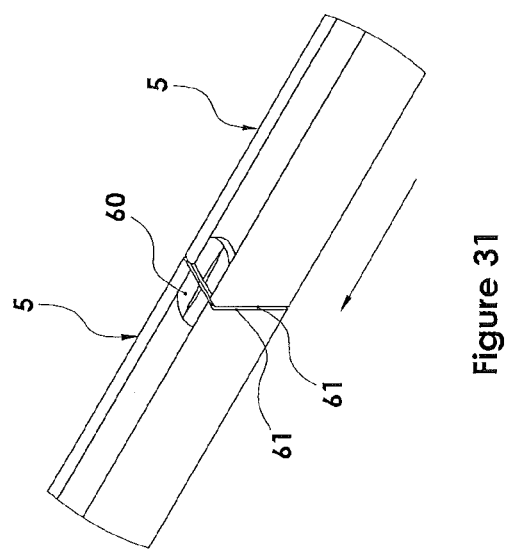
Figure 30:
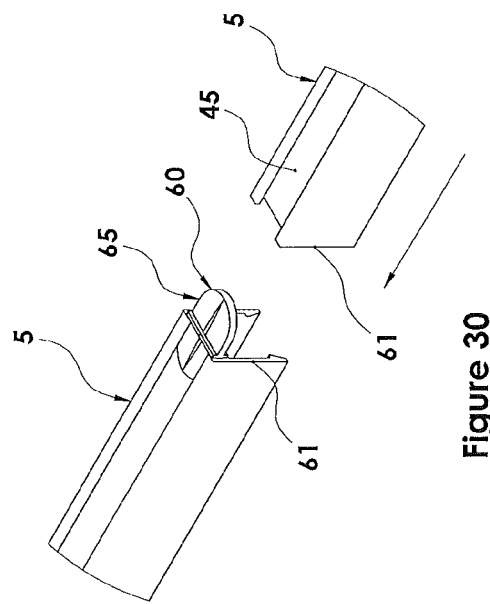
Figure 33:
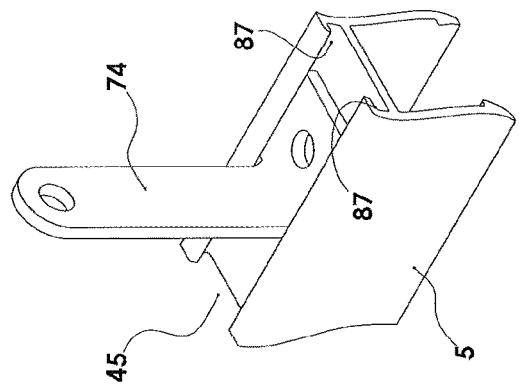
FIGS. 32-40 show a bracket clip member 13 which is adapted to be removably used either singly or in a double configuration to affix the panel capping member 5 to the overhead support structure 3.
Figure 32:
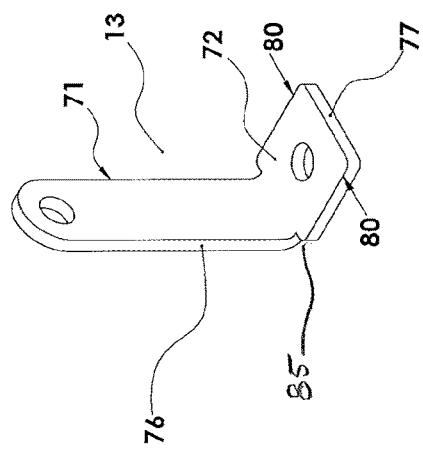
Figure 36:
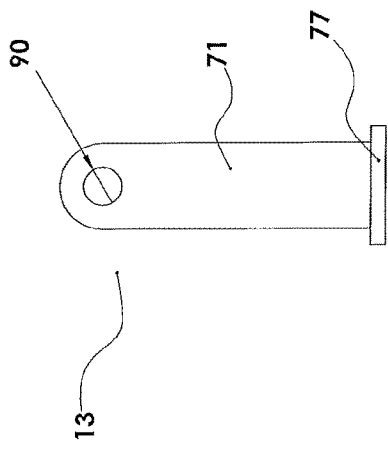
Figure 34:
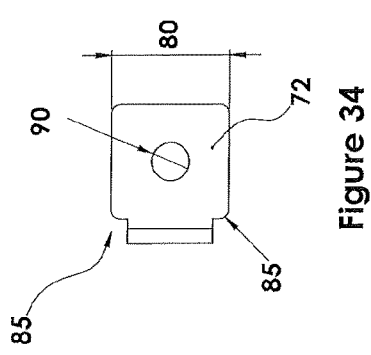
Figure 35:
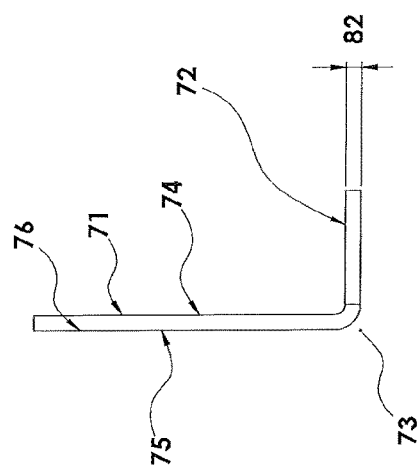
Figure 37:
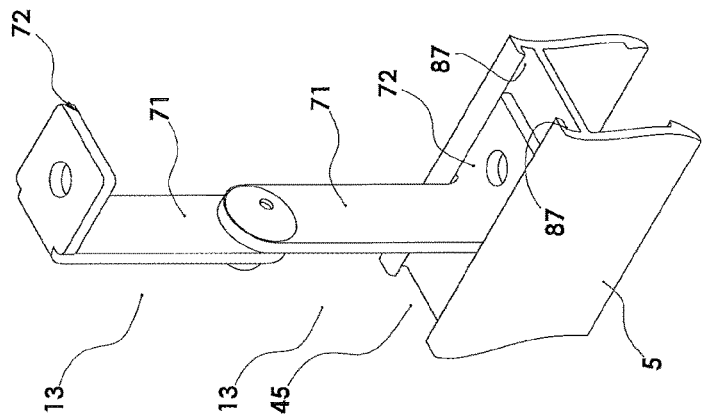
Figure 40:
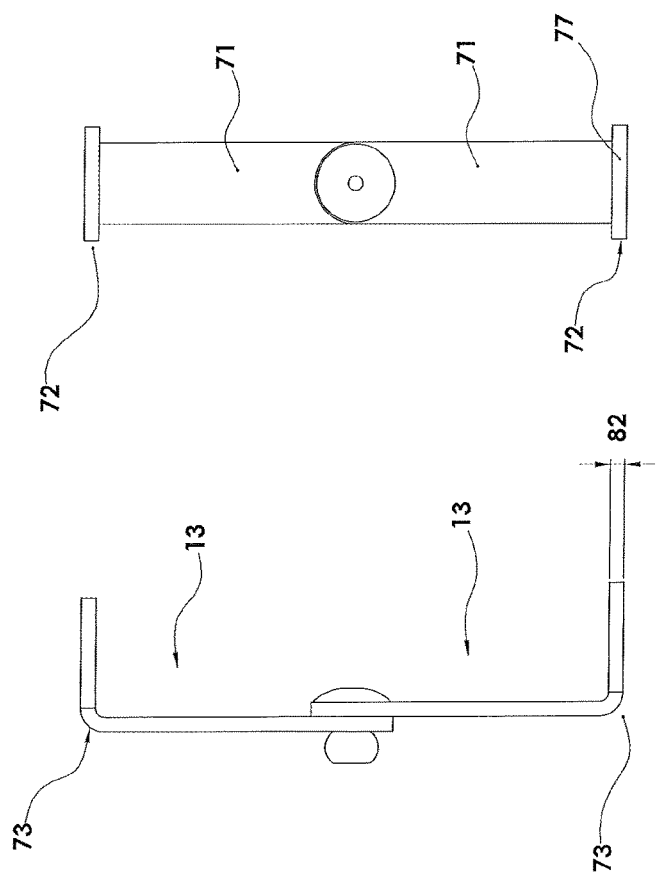
Figure 38:
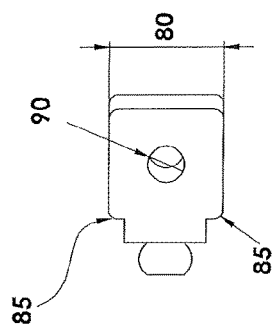
Figure 39:

As shown in FIGS. 29-31 each panel capping member 5 can be joined by at least one connection tab member 60. Each panel capping member 5 includes an elongate body having ends 61, defining a longitudinal direction (being in use parallel with the longitudinal direction 40a of the panel capping member 5) with first recess 44 and second recess 45. Transverse is a direction at right angles to the longitudinal direction and spans between the side edges 66. Connection tab member 60 is an elongate planar disc like shaped planar body with an upper surface 63 and lower surface 64 separated by a body thickness 65 and perimeter edge forming side edges 66 and end edges 67. End edges 67 are rounded. At least one transverse rib 68 is provided peripherally on at least the upper surface 63 and on the lower surface 64 which extends from side edge 66 to opposing side edge 66 and having a thickness 69. A longitudinal rib 70 can also be provided for strength to extend centrally from the transverse rib 68.

As shown in FIG. 30 in use one end of connection tab member is slidably received within the second recess 45 of one panel capping member 5 to allow one side of transverse rib 68 to abut end 61 to allow the other end of connection tab member 60 to protrude therefrom. Another panel capping member 5 has its end then slid over the protruding end of connection tab member 60 to also be slidably received within second recess 45 of the other panel capping member 5, to then have both ends 61 of both panel capping members 5 to be substantially abutting having the thickness of the transverse ribs 68 there between spacing the ends by the thickness 69 of the transverse ribs 68. The body thickness 65 is dimensioned to be less than a height distance underneath second hooks 43 of the second recess 45, to allow sliding receipt of the ends of the connection tab member 60. In other options the abutment of the panel member 2 ends can be separated by at least the thickness of the transverse rib 68 or there may be no gap because of recessed ends in the ends of the panel capping members 5.

Equally connection tab member 60 can also be used with the panel capping member 5 and cross support member 12.

Bracket clip member 13 is shown in FIGS. 32-40 and is also used to removably connect the panel capping member 5 to the overhead support structure 3 and is shaped as an L shaped planar body having a first leg 71 and second leg 72, separated by a corner intersection portion 73. The planar body has upper and lower planar surfaces 74, 75, side edges 76, end edges 77, a width 80 defined between side edges 76 and a thickness 82 defined between the upper and lower surfaces 74, 75. In use first leg 71 can be oriented vertically while second leg 71 can be oriented horizontally and can be called a tab member. Corner portion 73 has notches 85 located at the outer side edges 76.

As shown in the figures end edges 77 can be straight as for lower leg 72 or can be rounded as for upper leg 71.

The width 80 of second leg 72 of bracket clip member 13 is dimensioned to slidably interfit within second recess 45 of panel capping member 5. Second recess 45 includes an elongate slot formed by flanges including upwardly facing wall members ending with inwardly facing second hooks 43 which are in the form of a lip 87. The lips 87 narrow the elongate slot which widens below the lips 87. In use the notches 85 slide past the lip 87 to retain the second leg is a sliding capture therein.

The width and length of first and second legs can be made the same or different and each can include at least one aperture 90 there through for receipt of a suitable fastener. As shown in FIGS. 37-40 two bracket clip members can used whereby matching first leg 71 (eg can be vertically oriented) can be lapped and fastened (to be fixed and/or be rotatable) together thereby leaving legs 72 to be in use, horizontally oriented. Vertical fasteners can then be used in the uppermost leg 72 to be affixed to the overhead support structure and also downwardly in the lower most leg 72 for fixing to within the slot of the recess 45 of panel capping member 5.

First Summary of Installation Method—See FIGS. 1-9
The method can include the following steps of:
first attach the panel capping member 5 to one panel end edge of one panel member 2 to be affixed (using hooks 42) thereon fasten connectors 4 with fasteners 8 to underside or surface 20 of overhead support structure 3 in spaced apart spacing;
orient or firstly rotate each connector 4 having a longitudinal direction 28 to be at right angles to the longitudinal direction 28 of the panel capping member 5 with the truncated side edges parallel with the longitudinal direction 16 of the panel capping member 5 leaving a downwardly exposed first camming body 33;
bring one panel member 2 up to meet and capture by clipping the first camming body 33 leaving the middle portion 32 and second end portion 31 exposed;
in a second rotation of the connector 4, rotate the middle portion 32 and second end portion 31 to a right angle position with regard to the longitudinal direction 16 of panel capping member 5 or in parallel with the longitudinal direction 40a of the panel member 2 whereby the camming surfaces 36c of the connector cam with the camming surfaces 43a of the second recess 45 of the panel capping member 5;
optionally clip the locating protrusion 38 of second locating end portion 31 into a second recess 45 of the panel capping member 5.

In another option as seen in FIGS. 10-18, before attaching any connectors 4, a cross support member 12 can be supported and connected between the overhead support structure 3 and panel capping member 5 wherein the cross support member 12 is an elongate shaped member with its own longitudinal direction 49 which in use is oriented at right angles to the longitudinal direction 40a of the panel capping member 5 and of longitudinal direction 16 of panel member 2, and the elongate member of the cross support member 12 is provided with a cross section including a channel cross section with a base and side walls 51 with a first recess 54 there in, wherein the base is a cross bar 50 and the side walls 51 formed as an L shape having a restricted opening to the first recess wherein the first recess therein shaped and configured to slidably receive the second camming body 34 of at least one connector 4.

Installation of the panel member 2, overhead support 3, panel capping member 5 and connector 4 as shown in FIGS. 7-9 and 25—direct fixing.

In the first embodiment of the invention as seen in FIGS. 1-9, a method of installation includes: panel capping member 5 is slidably fitted to one end edge eg an upper end edge 15 of panel member 2 whereby an edge portion of the panel member 2 is encased or captured within first recess 44 of panel capping member 5, whereby first hooks 42 dig into the side surfaces 13 of the panel member 2 thereby establishing the longitudinal direction 28 which is parallel with length of the capping member 5. This means that the longitudinal direction 40a of the panel capping member 5 is parallel with the longitudinal direction 16 of the panel member 2.

Next each connector 4 (with its locating protrusion 38 downwardly projecting and first camming body 33 also downwardly protruding or exposed) is screwed to a suitable position on and in an underside or surface 20 of overhead support structure 3. Several connectors 4 can be screwed in place in several lines or rows depending on how many are required per panel and how many rows or lines of panels are required.

Each connector 4 is then rotated or oriented in a first rotation with its longitudinal direction 28 to be at right angles to the longitudinal direction 16 of the next positioned panel member 2 whereby the truncated sides 36b of the first camming body 33 of each connector 4 are downwardly exposed and are oriented parallel to the second recess 45 when the panel member 2 is to be brought up for fixing therein. The truncated side walls 36b of the second camming body 34 will be oriented at right angles to the orientation of the truncated walls 36b of the first camming body 33.

Next bring up a panel member 2 with second recess 45 of the capping member 5 upwardly exposed to then be slipped or slid and snap clipped over the truncated sides edges 36b of each connector 4 leaving a major portion of each connector 4 exposed for rotational use ie the middle portion 32 and second end portion 31. In this position each connector 4 is not gripping the panel capping member 5.

Once the panel member 2 is in place or position over at least one connector 4, then in a second rotation of the connector 4, rotate each connector 4 whereby the middle portion 32 with second end portion 31 together which then causes the lower truncated side edges 36b of platform 36 to move to be at right angles to the longitudinal direction 40a of the panel capping member 5 and the lower inner camming surfaces 36c to then ride over the camming surfaces 43a of the second hook 43 to grip the connector 4 to the panel capping member 5.

In this position the middle portion 32 and second end portion 31 are oriented parallel with the longitudinal direction 40a of the panel member 2 or longitudinal direction 16 of the panel capping member 5, to then lie within second recess whereby locating protrusion 38 of second end portion 31 can be located and/or clipped into place.

Second Summary of Installation Method—Direct Fixing—See FIGS. 1-9 first attach the panel capping member 5 to one panel edge of one panel member 2 to be affixed thereon leaving a second recess 45 protruding;

fasten connectors 4 with fasteners 8 to underside or surface 20 of the overhead support structure 3 in spaced apart spacing whereby second camming body abuts surface 20;

orient or firstly rotate each connector 4 having a longitudinal direction 28 to be at right angles to the longitudinal direction panel member 16 and longitudinal direction 40a of the panel capping member 5 with the truncated side edges parallel with the longitudinal direction 16 of the panel member 2 leaving a downwardly exposed first camming body 33;

bring one panel member 2 with panel capping member 5 thereon, up to meet so that second recess 45 of the panel capping member 5 captures the first camming body 33 leaving the middle portion 32 and second end portion 31 exposed;

in a second rotation of the connector 4 about the first end portion 30, rotate the middle portion 32 and second end portion 31 from a right angle position with regard to the longitudinal direction 40a of panel capping member 5 to then be in parallel with the longitudinal direction 16 of the panel member 2 and longitudinal direction 40a panel capping member 5 whereby the camming surfaces 36c of the connector cam with the camming surfaces 43a of the second recess 45 of the panel capping member 5;

clip the locating protrusion 38 and middle portion 32 of the second locating end portion 31 into a second recess 45 of the panel capping member 5.

Installation of the Panel Member 2, Overhead Support 3, Panel Capping Member 5, Connector 4 and Cross Support Member 12 as Shown in FIGS. 11-18—Indirect Fixing In the second embodiment of the invention as seen in FIGS. 16-18 and 26, panel capping member 5 is slidably fitted onto one end edge eg an upper end edge 15 of panel member 2 whereby a portion of the panel member 2 is encased within first recess 44 whereby first hooks 42 dig into the side surfaces 13 of the panel member 2. Longitudinal direction 16 of panel member 2 is commensurate with the length direction of panel cap member 5 and the planar extent of panel member 2 having a longitudinal direction 16 which are at this stage of the installation, parallel with each other.

Cross support member 12 can be supported and/or connected to overhead support structure 3 before or after fitting the panel capping member 5 to a panel member 2.

Next, each connector 4 having a longitudinal direction 28 (with locating protrusion 38 downwardly positioned and second camming body 34 upwardly captured), is slid into a suitable position of the cross support member 12 whereby second camming portion 34, of first end portion 30 is inserted into downwardly exposed first recess 54 of cross support member 12 leaving first camming portion 33 downwardly exposed or protruding. Several connectors 4 can be slid and/or clipped in place in several lines or rows along cross support member 12 depending on how many connectors 4 are required per panel or per cross support member 12 and how many rows or lines of panels are required per cross support member 12.

Each connector 4 is positioned or rotated in a first rotation whereby the longitudinal direction 28 of the connector 4 is oriented parallel with the longitudinal direction 49 of cross support member 12 and is at right angles to the longitudinal direction 16 of the panel member 2 whereby the truncated side edges 36b of the first camming body 33 are downwardly exposed ready for receipt of the second recess 45 of panel capping member 5 being oriented parallel with the longitudinal direction 40a of panel capping member 5 and longitudinal direction 16 of the panel member.

Next, bring up one panel member 2 with second recess 45 of the capping member 5 upwardly exposed to then cause it to be slid over and snap clipped to capture the truncated sides edges 36b of first camming portion 33 of each connector 4 leaving a major portion of each connector 4 exposed for use ie the middle portion 32 and second end portion 31. In this position each connector 4 is not yet gripping the cross support member 12 and panel capping member 5.

Once the panel member 2 with capping member 5 is in place or position over at least the first camming portion 33 of one connector 4, then in a second rotation, rotate each connector 4 using the middle portion 32 with second end portion 31 together which then causes both truncated sides (being 90 degrees offset with each other) to rotate each with inner camming surfaces. The rotation causes the truncated side edges 36b (of the second camming body 34 ie upper) to move to be at right angles to the longitudinal direction 49 of the cross support member 12 but be parallel with the longitudinal direction 16 of the panel member 2 and the camming surfaces 36c to then ride over the camming surfaces 52a of the second hook 53 to grip the connector 4 to the cross support member 12 and panel capping member 5 and at the same time also rotate the truncated side edges 36b of the first camming body 33 (lower) to also grip the camming surfaces 43a of second recess 45 of the panel capping member 5.

In this position, the middle portion 32 and second end portion 31 are oriented parallel with longitudinal planar extent or direction 40a of the panel member 2 to then lie within second recess whereby the locating protrusion 38 of second end portion 31 can be located or clipped into place.

Summary of Installation Method—Indirect Fixing—See FIGS. 11-18 first attach cross support member 12 having longitudinal direction 49 to overhead support structure 3 having first recess 54 downwardly protruding;

next attach first recess 44 of the panel capping member 5 having a longitudinal direction 16, to one panel edge 15 of panel member 2 to be affixed thereon;

slide and/or clip snap the connectors 4 having longitudinal direction 28 on to second first recess 54 of cross support member 12 whereby second camming portion 34 is attached to the underside or first recess 54 of overhead cross support member 12 in spaced apart spacing leaving first camming portion 31 downwardly exposed;

each connector 4 is oriented with their longitudinal direction 28 parallel with the longitudinal direction 49 of the cross support member 12 which will be at right angles to the longitudinal direction 16 of the panel member 2 when eventually connected, whereby the truncated side edges of the second camming body 34 are parallel with the longitudinal direction 49 of the cross support member 12 leaving an exposed first camming body 33;

bring one panel member 2 with panel capping member 5 with upwardly exposed second recess 45 of panel capping member 5, up to meet and capture and snap clip the first camming body 33 of the connector 4 leaving the middle portion 32 and second end portion 31 still exposed;

rotate the connector 4 whereby the middle portion 32 with second end portion 31 is rotated to a right angled position with regard to the cross support member 12 which is then in parallel with the longitudinal direction 16 of the panel member 2, to cause the camming portions of the connector 4 to grip the first recess 54 of cross support member 12 and the second recess 45 of panel capping member 5 whereby the camming surfaces 36c of the connector 4, cam with the camming surfaces 43a of the second recess 45 of the panel capping member 5 and also cam with camming surfaces 52a of the first recess 54 of the cross support member 12;

clip the locating protrusion 38 of the second locating end portion 31 of the connector 4 into second recess 45 of the panel capping member 5.

In another variation of the method steps, after connecting one panel member 2 with at least one connector 4 to the overhead support structure 3, connection tab members 60 can be used to end connect more panel members also connected by connectors to the overhead support structure 3.

In yet another variation of the method steps combination with any of the above steps, after connecting one panel member 2 with at least one connector 4 to the overhead support structure 3, at least one bracket clip member 13 can be used to removably connect between and to, the panel capping member 5 and overhead support structure 3.

Advantages
a) Quick method of installation
b) Modest cost of manufacture
c) Fin panel members are affixed in a stable manner
d) Pleasing aesthetic appearance
e) Can use different methods to install
f) Robust construction
g) Fin panel members can be part of a ceiling structure
h) Fin panel members can located as part of a wall
i) Simple method of installation
j) Protects top end of the panel
k) Can be directly fixed to an underside of a roof structure
l) Can join or connect several fin panels together
m) Can be used in different configurations and orientations
n) Can be used as an effective way of applying acoustic treatment to a space
o) Fin panels can be formed as a grid like structure
p) Fins panels can be joined to other fin panels Variations Throughout the description of this specification, the word "comprise" and variations of that word such as "comprising" and "comprises", are not intended to exclude other additives, components, integers or steps.

Connectors 4 can be formed of any suitable material (eg plastics or non-plastics, metal like for example steel or aluminium or any combination or any suitable material type) that allows each connector to slidably move in and to then rotate to grip through camming after rotation within the panel capping member 5, overhead support structure 3 and/or cross support member 12. Connectors 4 can be as thick or wide or as long as required be solid or hollow. The fixing portion and locating portions can be as large or long as required. The shape of the connector 4 can include a tapered thickness to facilitated clipping into place in the first recesses of the panel capping member and cross support member 12. This enables the middle portion and locating portion to sit or lie out of the way within the channel recess and then allow levering out when required to move or install any panels.

At least the lower recessed space or gap is required to grip part of the panel capping member 5 while the upper recessed space can be used to grip a part of an overhead support structure 3 or cross support member 12 or the upper recess space may not be used or required, instead or in combination using a direct fastening 8 through the apertures 90, instead of or in combination. The shape and orientation of the camming surfaces with the truncated end edges 36b and curved end edges 36a, can be varied so long as they enable first sliding insertion or clipping and then gripping after rotation, of the connector 4 to the panel capping member 5 or overhead support structure 3 or cross support members 12 to form the connection and fixing. It is the truncated end edges 36b having no camming surfaces that enable the fixing end to be freely slid into place whereas the camming surfaces of the curved end edges 36a are only activated when the locating end is rotated. All that is required for the connector to work is cross section that provides a groove or slot with inwardly facing flanges or hooks or lip formations to the slot or groove which can then allow a suitably dimensioned truncated end edge of a fixing end of the connector to be freely slid into positon and then rotated to allow the camming action of some curved end edge to work to grip. The actual shape of the curved end edges can also vary and be whatever still presents a camming surface.

The first and second camming bodies 33, 34 with base portion 35 and platform 36 can also be shaped and sized to suit the gripping requirement and size of panel capping member 5 and cross support member 12. The camming surfaces 36c of the curved end edges 36a can be varied in terms of degree of curvature and spacing. Additionally the orientation of the parallel truncated side walls of platform portion 36 of the first camming body 33 and the truncated side walls of the second camming body 34, though shown as been located at right angles with respect to each other, they can also be oriented parallel with each other which can also cause the panels 2 to be in parallel orientation with the cross support members 12. The camming surfaces 36c are shown as being provided on one surface of the curved end edges 36a of one camming body in the recessed gap though in another variation, another camming surfaces 36c can be provided on the other surface of the other curved end edge 36a of the other camming body of its recessed gap eg on the surface of the end portion of the centrally located elongate planar body. Camming surfaces 36c are provided on the truncated end edges 36b which is to allow the fixing end to be freely slid into place.

Panel capping member 5 and cross support member 12 are shown as having the same cross section though they can be different which can be formed of any suitable material such as for example, steel or aluminium. For example 12 might not need the second recess 55 as this member can be simply fastened directly through cross bar 50. The depth and size of the recesses 44, 45, 54, 55 can also be varied to suit any requirements. The shape of the first and second hooks 42, 43 can be altered to suit particular connectors 4 or particular panel members 2. Hooks 42 can be made to be sharper to dig in better or simply be omitted and replaced with side apertures for screw or bolt fastening into panel member 2.

Equally the number and spacing of the connectors 4 can be varied to suit particular material type or loadings. Though right angles or parallel orientations of the panel members 2 are disclosed, other angles are equally possible depending on the particular angle for the vertical orientation of the panels required. The shapes of the end edges including truncated edges and curved edges can also be varied to suit requirements and function.

In regard to the installation steps, the attachment or fixing of the panel capping member 5 to a panel member 2 can be carried out at the beginning or after attaching the connectors to the overhead support 3 or cross support member 12. The fasteners are shown as being screws but equally other forms of attachment are possible such as for example bolting, welding or adhesive.

In the above mentioned methods of installation where the steps are made in reference to assembling the panel members 2, panel capping members 5, connectors 4, overhead support structures 3 and cross support members 12, there are other optional components such as connection tab members 60 and bracket clip members 13 that can be used at many different positions in the aforementioned method steps.

The connection tab members 60 can be inserted to join panel members with panel capping members 5 in place which can vary depending on when the panel capping members 5 are put on each panel member 2. Additionally the bracket clip members 13 are also dependent there being panel capping members 5 which should be attached to a panel member 2 but equally the panel capping member and panel member can be assembled after or before different steps of the methods as required or when convenient.

Though we have said that the fixing means includes a first camming body which is a lower camming body which is for connection to the panel capping member 5 and a further fixing means can either be another camming body ie upper camming body and or a direct fixing of a fastener through the fixing end, equally this can be swapped around to allow an upper camming body to be connected to the overhead support structure 3 with some form of direct fastening to downwardly connect the connector 4 to the panel member or panel capping member 5. The direct fastening which can include at least one screw fastener 8 can be used for the top and bottom to be used in combination with any other fixing such as the camming bodies.

The connectors 4 are designed to connect or affix each panel capping member 5 or panel member 2 to the overhead support structure 3. Depending on the size, orientation and weight of each panel member 2, there can be more than one connector 4 per panel member 2 or panel capping member 5 to both connect and/or support the panel member 2 if required. Though the overhead support structure 3 is shown as being part of a ceiling or roof structure, equally any other support structure is also possible at any angle as long as the connectors can be connected and rotated accordingly like for example a sloping overhead support structure a wall, partitions or false ceilings etc.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described. It will also be understood that where a product, method or process as herein described or claimed and that is sold incomplete, as individual components, or as a "kit of Parts", that such exploitation will fall within the ambit of the invention.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

For purposes of the description hereinafter, the terms "upper", "lower", "right", "left", "vertical", "horizontal", "top", "bottom", "lateral", "longitudinal", "side", "front", "rear" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

What we claim is:

1. A connector for connecting a panel member to an overhead support structure or cross support member, the connector including an elongate planar body with a first planar surface and second planar surface separated by a thickness dimension, having side edges and end edges whereby the side edges define a longitudinal direction parallel with the side edges' length and the end edges define a transverse direction, the side and end edges being in a horizontal plane, the elongate planar body includes a first end portion and a second end portion separated by a middle portion, the first end portion comprises an enlarged partially rounded shape, wherein the first end portion is a fixing portion and the second end portion is a locating portion, the fixing portion includes fixing means to removably affix the connector to a panel capping member or overhead support structure, wherein the fixing portion includes a first camming body extending outwardly at a right angle to the longitudinal direction in a vertical direction from the first planar surface and the camming body includes a base portion extending in the same direction as the first camming body from the end portion, leading to a platform being spaced from the first planar surface of the elongate planar body forming at least one recessed gap for the locating of camming surfaces, and the fixing portion also includes a further fixing means to affix the connector to the overhead support structure or panel capping member, the further fixing means including a second camming body extending outwardly at a right angle to the longitudinal direction in a vertical direction opposite from the direction the first camming body extends from the second planar surface and the second camming body includes a base portion extending in a direction opposite to the first camming body from the end portion, leading to a platform portion being spaced from the second planar surface of the elongate planar body forming at least one recessed gap for the locating of the camming surfaces.

2. The connector as claimed in claim 1, wherein each platform portion of the connector includes a body with an outer planar surface and inner surface, wherein the camming surface of the platform portion is located on the inner surface and comprises a contoured portion, rising and falling towards the first or second end portions of the elongate planar body whereby the camming surfaces of one platform portion, face the camming surfaces of the adjacent platform portion at the fixing portion of the connector but are separated by the base portion on each face of an end portion of the elongate planar body of the connector and centrally by end portion, forming an upper and lower recessed gap between the sides of one base portion and camming surface and end face of the elongate planar body.

3. The connector as claimed in claim 2 wherein the fixing portion is adapted to be first located and then fixed or connected to the overhead support structure or cross support member and panel capping member, and the locating portion is adapted to provide a handle to operate by rotation of the connector about the fixing portion to cause connecting or disconnecting.

4. The connector as claimed in claim 3 wherein each camming surface includes at least one separated pair of continuous rising and falling portions per camming body located on opposite sides of the end portion of the elongate planar body of the connector which are firstly of the first camming body are positioned parallel with the side edges and are secondly in the second camming body positioned at right angles to the sides edges wherein each camming surface includes a rising portion leading to a falling portion, leading to a rising portion leading to a falling portion, in a continuous contoured smooth shape.

5. The connector as claimed in claim 4,
wherein each platform portion has curved end edges separated by truncated end edges to facilitate locking and insertion of the platform portion into the panel capping member and to the cross support member,
wherein the truncated end edges of one of the camming bodies are oriented at right angles to the other truncated end edges of the other camming body,
wherein the truncated end edges are adapted to allow insertion in the panel capping member and the curved end edges which provide an extended shape when compared to the truncated end edges, are designed to extend into and under a flange, hook or lip of the panel capping member, overhead support structure and cross support structure, wherein the orientation of the truncated end edges and curved end edges and the associated sequence of rising and falling portions, of each camming body orientable in parallel with each other but at right angles when comparing each camming body to the other camming body, to facilitate insertion and locking with a parallel oriented overhead support member or cross support member with regard to the orientation of the panel capping member, and
wherein the camming surfaces are provided underneath the curved end edges and not as part of the truncated end edges so that the truncated end edges enable the fixing portion to be freely slid into place whereas the curved end edges with camming surfaces are only activated when the locating portion is rotated.

6. The connector as claimed in claim 5, wherein a width of the elongate planar body of the connector, between the side edges is selected to be less in width of the distance between sides walls of the first and second recesses of the panel capping member and cross support member, whereby the curved side edges extend beyond the side edges, wherein the thickness of the elongate planar body varies across the length of the elongate planar body having a thinnest end at the locating portion causing one of the planar surfaces to be angled to facilitate location with the second recess of the panel capping member and first recess cross support member.

7. The connector as claimed in claim 6 wherein the further fixing means includes at least one fixing aperture which is provided through the fixing end and is shaped and adapted to slidably or threadingly receive at least one fastener there through to and into the overhead support structure.

8. The connector as claimed in claim 7 wherein, the locating portion which is distal to the fixing portion, comprises a locating protrusion extending at least in the vertical direction perpendicular from the second planar surface of the elongate planar body at the end portion and is shaped to allow sliding or clipping into locking into a panel capping member.

9. The connector as claimed in claim 8 wherein when the locating portion is operated to cause rotation of the elongate planar body of the connector, the lower recessed gap is adapted to grip at least a portion of the panel capping member and the upper recessed gap is adapted to grip at least a portion of the overhead support structure or cross support member.

10. A panel fixing assembly configured and adapted to connect a panel member to an overhead support structure, the panel fixing assembly includes at least one connector and panel capping member, the panel capping member can be affixed to one panel member with more than one connector movably connected between the panel capping member and overhead support structure utilizing suitable fasteners to connect at least one ceiling panel therefrom wherein the connector is for connecting a panel member to the overhead support structure or cross support member, and the connector includes an elongate planar body with a first planar surface and second planar surface separated by a thickness dimension, having side edges and end edges whereby the side edges define a longitudinal direction parallel with the side edges' length and the end edges define a transverse direction, the side and end edges being in a horizontal plane, the elongate planar body includes a first end portion and a second end portion separated by a middle portion, the end portion comprises an enlarged partially rounded shape, wherein the first end portion is a fixing portion and the second end portion is a locating portion, the fixing portion includes fixing means to removably affix the connector to a panel capping member or overhead support structure, wherein the fixing portion includes a first camming body extending outwardly at a right angle to the longitudinal direction in a vertical direction from the first planar surface and the camming body includes a base portion extending in the same direction as the first camming body from the end portion, leading to a platform portion being spaced from the first planar surface of the elongate planar body forming at least one recessed gap for the locating of camming surfaces, and the fixing portion also includes a further fixing means to affix the connector to the overhead support structure or panel capping member, the further fixing means including a second camming body extending outwardly at a right angle to the longitudinal direction in a vertical direction opposite from the direction the first camming body extends from the second planar surface and the second camming body includes a base portion extending in a direction opposite to the first camming body from the end portion, leading to a platform portion being spaced from the second planar surface of the elongate planar body forming at least one recessed gap for the locating of the camming surfaces.

11. The panel fixing assembly as claimed in claim 10, the ceiling panel member is a planar member being a fin panel adapted to be affixed in a substantially vertical position wherein each fin panel has a first planar surface separated from a second planar surface by edges defining a longitudinal direction parallel with the first and second planar surfaces of the fin panel.

12. The panel fixing assembly as claimed in claim 11, the panel capping member is shaped having an elongate planar body having a length also defining a longitudinal direction, the panel capping member comprising a channel cross section including a base member in the form of cross bar between side walls, a first hook and a second hook, one side of the cross bar between the side walls defines a first recess and the other side of the cross bar defines a second recess, the first recess includes side walls ending in a first hook which comprises a truncated point end, a second recess includes a space of smaller depth and volume than the first recess and includes the side walls ending in the second hook with inner camming surfaces therein which comprise a right angle portion facing inwardly of the second recess wherein the cross bar is formed as a straight or planar member forming an H cross section with cross bar being located closer to one end.

13. The panel fixing assembly as claimed in claim 12 wherein, the cross bar of the panel capping member is formed as a stepped member whereby there is formed a channel cross section forming the first recess with the second recess being recessed into the cross bar to protrude within the first recess and not outwardly beyond.

14. The panel fixing assembly as claimed in claim 12 wherein each platform portion of the connector includes a body with an outer planar surface and inner surface, wherein a camming surface is located on the inner surface and comprise a contoured portion, rising towards the first or second end portions whereby the camming surfaces of one platform portion, face the camming surfaces of the adjacent platform portion at the fixing portion of the connector but are separated by the base portion on each side of an end portion of the elongate planar body of the connector and centrally by end portion, forming an upper and lower recessed gap between the sides of one base portion and camming surface and end face of the elongate planar body.

15. The panel fixing assembly as claimed in claim 14 wherein the fixing end is adapted to be first located and then fixed or connected to the overhead support structure or cross support member and panel capping member, and the locating end is adapted to provide a handle to operate by rotation of the connector about the fixing end to cause connecting or disconnecting.

16. The panel fixing assembly as claimed in claim 15 wherein each camming surface includes at least one separated pair of continuous rising and falling portions per camming body located on opposite sides of the end portion of elongate planar body of the connector which are firstly of the first camming body are positioned parallel with the side edges and are secondly in the second camming body positioned at right angles to the sides edges wherein each camming surface includes a rising portion leading to a falling portion, leading to a rising portion leading to a falling portion, in a continuous contoured smooth shape.

17. The panel fixing assembly as claimed in claim 16 wherein each platform portion has curved end edges separated by truncated end edges to facilitate locking and insertion of the platform portion into the panel capping member and to the cross support member wherein the truncated end edges of one of the camming bodies are oriented at right angles to the other truncated end edges of the other camming body wherein the truncated end edges are adapted to allow insertion in the panel capping member and the curved end edges which provide an extended shape when compared to the truncated end edges, are designed to extend into and under a flange of the panel capping member 5 overhead support structure and cross support structure 12 wherein the orientation of the truncated end edges and curved end edges and the associated sequence of rising and falling portions of the camming body, of each camming body can be oriented in parallel with each other but be at right angles when comparing each camping body to the other camming body, to facilitate insertion and locking with a parallel oriented overhead support member or cross support member with regard to the orientation of the panel capping member wherein the camming surfaces are provided underneath the curved side edges and not as part of the truncated end edges so that the truncated end edges enable the fixing end to be freely slid into place whereas the curved end edges with camming surfaces are only activated when the locating end is rotated.

18. The panel fixing assembly as claimed in claim 17 wherein a width between the side edges of each connector is selected to be less in width of the distance between the sides walls of the first and second recesses of the panel capping member and cross support member, whereby the curved side edges extend beyond the side edges and the thickness of the elongate planar body of the connector varies across the length of the elongate planar body having a thinnest end at the locating portion causing one of the planar surfaces of the elongate planar to be angled to facilitate location with the second recess of the panel capping member and first recess cross support member.

19. The panel fixing assembly as claimed in claim 18, wherein the further fixing means of the connector includes at least one fixing aperture which is provided through the fixing end and is shaped and adapted to slidably or threadingly receive at least one fastener there through to and into the overhead support structure wherein the further fixing means includes at least one fixing aperture which is provided through first camming body through the cylindrical based portion of the elongate planar body and then through the second camming body.

20. The panel fixing assembly as claimed in claim 19 wherein the locating portion which is distal to the fixing portion, and comprises a locating protrusion 38 extending at least in the vertical direction perpendicular from the planar surface of the elongate planar body at the end portion and is shaped to allow sliding and/or clipping into locking into a panel capping member.

21. The panel fixing assembly as claimed in claim 20 wherein when the locating portion is operable to cause rotation of the elongate planar body of the connector, the lower recessed gap is adapted to grip at least a portion of the panel capping member or the upper recessed gap is adapted to grip at least a portion of the overhead support structure or cross support member.

22. The panel fixing assembly as claimed in claim 21, wherein the overhead support structure 3 includes a support structure capable of supporting the ceiling panel assembly, and wherein the overhead support structure provides a downwardly facing support surface for abutment and affixing of the ceiling panel fixing assembly.

23. The panel fixing assembly as claimed in claim 22 wherein there are plural connectors movably supported between each panel capping member and overhead support structure.

24. The panel fixing assembly as claimed in claim 23, wherein, in use, the panel capping member is attached to one panel edge of a panel member 2, the connectors with fasteners are fastened to the overhead support structure in spaced apart spacing, each connector having a longitudinal direction is firstly oriented for insertion, to be at right angles to the longitudinal direction of the panel capping member with the truncated side edges parallel with the longitudinal direction of the panel capping member leaving a downwardly exposed first camming body, at least one panel captures the first camming body leaving the middle portion and second end portion exposed so that the middle portion and second end portion are then secondly to fix are rotated to a right angle position with regard to the longitudinal direction of panel capping member to be parallel with the longitudinal plane of the panel member and panel capping member and the locating protrusion of second locating end portion is clipped into second recess of the capping member.

25. The panel fixing assembly as claimed in claim 24 wherein a cross support member is supported and connected between the overhead support structure and panel capping member wherein the cross support member is an elongate shaped member with the cross support member's longitudinal direction which in use is oriented at right angles to the longitudinal direction of the panel capping member and panel member.

26. The panel fixing assembly as claimed in claim 25 wherein the elongate member of the cross support member is provided with a cross section including a channel cross section with a base and side walls with a first recess there in, wherein the base extends between the side walls formed as an L shape having a restricted opening to the first recess wherein the first recess therein shaped and configured to slidably receive the second cam body of at least one connector 4 the channel cross section is part of an H cross section wherein there is a second recess on the other side of the base which is adapted to receive fasteners to the overhead support structure.

27. The panel fixing assembly as claimed in claim 26 wherein the channel cross section is U shaped channel whereby the first recess is recessed within the base.

28. The panel fixing assembly as claimed in claim 26 wherein the assembly includes a connection tab member comprising an elongate planar member having a centrally located transverse rib located peripherally at least on an upper and lower surfaces and having a thickness, when the connection tab member is interfitted in the assembly by being slidably received in an abutting second recess of opposing ends of panel capping members and the transverse ribs abut the ends of the panel capping members separating the ends of the panel capping members from each other by the thickness of the transverse ribs.

29. The panel fixing assembly as claimed in claim 28 wherein the assembly includes at least one bracket clip member including a first bracket clip member for fixing the panel capping member to the overhead support structure, comprises a body with an L shape in cross section having a first leg and second leg joined by a corner portion, formed as a planar body having sides, ends, a width between the sides and at least one aperture whereby in use the first leg is a vertical leg and the second leg is a horizontal leg, the corner portion includes notches on both sides wherein the second leg is sized and oriented to slidably interfit within the second recess formed of flanges with inwardly facing lips forming a narrow gap there between of the panel capping member wherein the notches interfit with the lips such that fasteners are insertable through each aperture for fixing.

30. The panel fixing assembly as claimed in claim 29 wherein the second leg is adapted to lap and be fixed with a first leg of a second bracket clip member thereby presenting a second leg parallel with the second leg of the first bracket clip member forming in cross section a square U shaped oriented on its side.

* * * * *